(12) United States Patent
Manthiram et al.

(10) Patent No.: US 8,722,246 B2
(45) Date of Patent: May 13, 2014

(54) CATION-SUBSTITUTED SPINEL OXIDE AND OXYFLUORIDE CATHODES FOR LITHIUM ION BATTERIES

(75) Inventors: Arumugam Manthiram, Austin, TX (US); Wonchang Choi, Austin, TX (US)

(73) Assignee: Board of Regents of the University of Texas System, Austin, TX (US)

(*) Notice: Subject to any disclaimer, the term of this patent is extended or adjusted under 35 U.S.C. 154(b) by 832 days.

(21) Appl. No.: 12/752,779

(22) Filed: Apr. 1, 2010

(65) Prior Publication Data
US 2010/0183925 A1 Jul. 22, 2010

Related U.S. Application Data

(62) Division of application No. 11/861,252, filed on Sep. 25, 2007, now Pat. No. 7,718,319.

(60) Provisional application No. 60/846,974, filed on Sep. 25, 2006.

(51) Int. Cl.
*H01M 4/52* (2010.01)
*H01B 1/08* (2006.01)

(52) U.S. Cl.
USPC .............. 429/218.1; 429/231.95; 252/521.2

(58) Field of Classification Search
USPC .............. 252/500, 518.1, 521.2; 429/218.1, 429/231.95
See application file for complete search history.

(56) References Cited

U.S. PATENT DOCUMENTS

| 3,939,008 A | 2/1976 | Longo et al. |
|---|---|---|
| 3,939,010 A | 2/1976 | Coleman et al. |
| 3,944,435 A | 3/1976 | Kordesch |
| 3,945,847 A | 3/1976 | Kordesch et al. |
| 3,945,849 A | 3/1976 | Hoffman |
| 3,953,235 A | 4/1976 | Blomgren et al. |
| 3,953,242 A | 4/1976 | Hoffman |
| 3,954,505 A | 5/1976 | Anderson |
| 3,961,985 A | 6/1976 | Takamura et al. |
| 3,970,476 A | 7/1976 | Cerfon |
| 3,982,960 A | 9/1976 | Hoekje et al. |

(Continued)

FOREIGN PATENT DOCUMENTS

| CN | 1476117 A | 2/2004 |
|---|---|---|
| EP | 0390185 | 10/1990 |

(Continued)

OTHER PUBLICATIONS

Amatucci et al., Enhancement of the electrochemical properties of Li1Mn2O4 through chemical substitution, 1999, Journal of Power Sources, 81-82, pp. 39-43.*

(Continued)

*Primary Examiner* — Mark Kopec
(74) *Attorney, Agent, or Firm* — Meyertons, Hood, Kivlin, Kowert & Goetzel, P.C.; Eric B. Meyertons

(57) ABSTRACT

The present invention includes compositions and methods of making cation-substituted and fluorine-substituted spinel cathode compositions by firing a $LiMn_{2-y-z}Li_yM_zO_4$ oxide with $NH_4HF_2$ at low temperatures of between about 300 and 700° C. for 2 to 8 hours and a η of more than 0 and less than about 0.50, mixed two-phase compositions consisting of a spinel cathode and a layered oxide cathode, and coupling them with unmodified or surface modified graphite anodes in lithium ion cells.

10 Claims, 7 Drawing Sheets

(56) References Cited

U.S. PATENT DOCUMENTS

| | | | |
|---|---|---|---|
| 3,998,525 | A | 12/1976 | Giglia |
| 4,041,220 | A | 8/1977 | Armand |
| 4,049,790 | A | 9/1977 | Horowitz et al. |
| 4,068,018 | A | 1/1978 | Hashimoto et al. |
| 4,076,386 | A | 2/1978 | Giglia |
| 4,079,174 | A | 3/1978 | Beck et al. |
| 4,091,178 | A | 5/1978 | Kordesch |
| 4,096,318 | A | 6/1978 | Wurmb et al. |
| 4,101,716 | A | 7/1978 | Horowitz et al. |
| 4,105,815 | A | 8/1978 | Buckler |
| 4,112,205 | A | 9/1978 | Charkoudian et al. |
| 4,113,921 | A | 9/1978 | Goldstein et al. |
| 4,121,018 | A | 10/1978 | Kocherginsky et al. |
| 4,125,638 | A | 11/1978 | Watanabe et al. |
| 4,125,687 | A | 11/1978 | Di Salvo, Jr. et al. |
| 4,133,856 | A | 1/1979 | Ikeda et al. |
| 4,146,458 | A | 3/1979 | Horowitz et al. |
| 4,163,706 | A | 8/1979 | Horowitz et al. |
| 4,172,183 | A | 10/1979 | Rüetschi |
| 4,192,914 | A | 3/1980 | Ruetschi |
| 4,197,362 | A | 4/1980 | Schmidberger et al. |
| 4,197,366 | A | 4/1980 | Tamura et al. |
| 4,197,367 | A | 4/1980 | Deborski |
| 4,209,577 | A | 6/1980 | Clash |
| 4,216,247 | A | 8/1980 | Ikeda et al. |
| 4,221,853 | A | 9/1980 | Tye et al. |
| 4,225,657 | A | 9/1980 | Klein et al. |
| 4,233,376 | A | 11/1980 | Atkinson et al. |
| RE30,458 | E | 12/1980 | Uetani et al. |
| 4,246,253 | A | 1/1981 | Hunter |
| 4,246,324 | A | 1/1981 | De Nora et al. |
| 4,247,606 | A | 1/1981 | Uetani et al. |
| 4,248,945 | A | 2/1981 | Alvarez et al. |
| 4,260,523 | A | 4/1981 | Tsukamoto |
| 4,260,669 | A | 4/1981 | Kerg |
| 4,264,689 | A | 4/1981 | Moses |
| 4,268,589 | A | 5/1981 | Tamminen |
| 4,269,691 | A | 5/1981 | Deborski |
| 4,277,360 | A | 7/1981 | Mellors et al. |
| 4,281,046 | A | 7/1981 | Davis, Jr. |
| 4,284,618 | A | 8/1981 | Van Der Heyden et al. |
| 4,288,411 | A | 9/1981 | Holland et al. |
| 4,288,506 | A | 9/1981 | Coetzer et al. |
| 4,297,231 | A | 10/1981 | Kahara et al. |
| 4,297,421 | A | 10/1981 | Turillon et al. |
| 4,306,005 | A | 12/1981 | Ruben |
| 4,310,609 | A | 1/1982 | Liang et al. |
| 4,312,930 | A | 1/1982 | Hunter |
| 4,324,828 | A | 4/1982 | Ebato et al. |
| 4,327,166 | A | 4/1982 | Leger |
| 4,328,288 | A | 5/1982 | Taylor |
| 4,332,871 | A | 6/1982 | Charkey |
| 4,333,993 | A | 6/1982 | Gibbard |
| 4,336,315 | A | 6/1982 | Eda et al. |
| 4,340,653 | A | 7/1982 | Adams |
| 4,341,848 | A | 7/1982 | Liu et al. |
| 4,361,633 | A | 11/1982 | Nel et al. |
| 4,366,215 | A | 12/1982 | Coetzer et al. |
| 4,370,395 | A | 1/1983 | Nagaura et al. |
| 4,374,050 | A | 2/1983 | Ray |
| 4,374,701 | A | 2/1983 | Singh |
| 4,374,761 | A | 2/1983 | Ray |
| 4,379,817 | A | 4/1983 | Kozawa |
| 4,384,029 | A | 5/1983 | Kordesch et al. |
| 4,390,604 | A | 6/1983 | Evans et al. |
| 4,397,925 | A | 8/1983 | Magahed |
| 4,399,008 | A | 8/1983 | Ray |
| 4,401,735 | A | 8/1983 | Moses et al. |
| 4,401,737 | A | 8/1983 | Joshi |
| 4,405,699 | A | 9/1983 | Kruger |
| 4,407,910 | A | 10/1983 | Catanzarite |
| 4,413,502 | A | 11/1983 | Ohta et al. |
| 4,419,422 | A | 12/1983 | Leger et al. |
| 4,419,423 | A | 12/1983 | Leger |
| 4,448,856 | A | 5/1984 | Zuckerbrod et al. |
| 4,448,864 | A | 5/1984 | Broussely |
| 4,451,543 | A | 5/1984 | Dzieciuch et al. |
| 4,455,358 | A | 6/1984 | Graham et al. |
| 4,463,070 | A | 7/1984 | Affeldt |
| 4,465,747 | A | 8/1984 | Evans |
| 4,466,470 | A | 8/1984 | Bruder |
| 4,476,104 | A | 10/1984 | Mellors |
| 4,478,693 | A | 10/1984 | Ray |
| 4,478,921 | A | 10/1984 | Langan |
| 4,490,449 | A | 12/1984 | Moses et al. |
| 4,507,371 | A | 3/1985 | Thackeray et al. |
| 4,512,871 | A | 4/1985 | Kato et al. |
| 4,529,676 | A | 7/1985 | Galloway et al. |
| 4,530,888 | A | 7/1985 | Baron et al. |
| 4,541,172 | A | 9/1985 | Evans |
| 4,555,457 | A | 11/1985 | Dhanji |
| 4,560,631 | A | 12/1985 | Nishihama et al. |
| 4,579,791 | A | 4/1986 | Wang |
| 4,584,252 | A | 4/1986 | Touzain et al. |
| 4,585,715 | A | 4/1986 | Marple |
| 4,585,718 | A | 4/1986 | Uedaira et al. |
| 4,590,059 | A | 5/1986 | Mellors |
| 4,595,643 | A | 6/1986 | Koshiba et al. |
| 4,599,157 | A | 7/1986 | Suzuki et al. |
| 4,601,919 | A | 7/1986 | Asami et al. |
| 4,604,336 | A | 8/1986 | Nardi |
| 4,608,279 | A | 8/1986 | Schumm, Jr. |
| 4,609,599 | A | 9/1986 | Percheron nee Guegan et al. |
| 4,613,552 | A | 9/1986 | Ruben |
| 4,632,890 | A | 12/1986 | Wang |
| 4,645,622 | A | 2/1987 | Kock |
| 4,662,065 | A | 5/1987 | Marincic et al. |
| 4,680,094 | A | 7/1987 | Duruz |
| 4,719,187 | A | 1/1988 | Bardhan et al. |
| 4,737,253 | A | 4/1988 | Gesing et al. |
| 4,751,086 | A | 6/1988 | Jeffrey et al. |
| 4,758,484 | A | 7/1988 | Furukawa et al. |
| 4,760,002 | A | 7/1988 | Schneider et al. |
| 4,814,522 | A | 3/1989 | Weigert |
| 4,956,068 | A | 9/1990 | Nguyen et al. |
| 5,229,225 | A | 7/1993 | Shackle |
| 5,231,074 | A | 7/1993 | Cima et al. |
| 5,262,253 | A | 11/1993 | Golovin |
| 5,262,254 | A | 11/1993 | Koksbang et al. |
| 5,290,702 | A | 3/1994 | Chang |
| 5,290,704 | A | 3/1994 | Chang |
| 5,294,501 | A | 3/1994 | Chaloner-Gill |
| 5,294,502 | A | 3/1994 | Shackle et al. |
| 5,300,373 | A | 4/1994 | Shackle |
| 5,300,375 | A | 4/1994 | Chaloner-Gill |
| 5,302,474 | A | 4/1994 | Shackle |
| 5,304,436 | A | 4/1994 | Chang |
| 5,316,556 | A | 5/1994 | Morris |
| 5,326,545 | A | 7/1994 | Koksbang et al. |
| 5,326,653 | A | 7/1994 | Chang |
| 5,330,856 | A | 7/1994 | Gonzalez |
| 5,334,334 | A | 8/1994 | Koksbang |
| 5,336,572 | A | 8/1994 | Koksbang |
| 5,340,368 | A | 8/1994 | Koksbang et al. |
| 5,340,669 | A | 8/1994 | Chaloner-Gill et al. |
| 5,340,671 | A | 8/1994 | Koksbang |
| 5,342,710 | A | 8/1994 | Koksbang |
| 5,346,385 | A | 9/1994 | McAleavey |
| 5,346,787 | A | 9/1994 | Chaloner-Gill |
| 5,352,270 | A | 10/1994 | Shackle |
| 5,354,631 | A | 10/1994 | Chaloner-Gill et al. |
| 5,357,786 | A | 10/1994 | Lung et al. |
| 5,358,539 | A | 10/1994 | Dawson et al. |
| 5,358,620 | A | 10/1994 | Golovin et al. |
| 5,358,658 | A | 10/1994 | Pradhan et al. |
| 5,358,801 | A | 10/1994 | Brodd |
| 5,366,829 | A | 11/1994 | Saidi |
| 5,366,830 | A | 11/1994 | Koksbang |
| 5,368,959 | A | 11/1994 | Koksbang et al. |
| 5,384,213 | A | 1/1995 | Olsen |
| 5,387,479 | A | 2/1995 | Koksbang |
| 5,390,230 | A | 2/1995 | Chang |
| 5,393,621 | A | 2/1995 | Chaloner-Gill |
| 5,399,447 | A | 3/1995 | Chaloner-Gill et al. |

(56) References Cited

U.S. PATENT DOCUMENTS

| | | |
|---|---|---|
| 5,405,715 A | 4/1995 | Dawson et al. |
| 5,408,184 A | 4/1995 | Moulton |
| 5,411,764 A | 5/1995 | Koksbang |
| 5,411,820 A | 5/1995 | Chaloner-Gill |
| 5,418,089 A | 5/1995 | Chaloner-Gill et al. |
| 5,418,090 A | 5/1995 | Koksbang et al. |
| 5,419,890 A | 5/1995 | Saidi |
| 5,419,982 A | 5/1995 | Tura et al. |
| 5,419,984 A | 5/1995 | Chaloner-Gill et al. |
| 5,419,985 A | 5/1995 | Koksbang |
| 5,422,332 A | 6/1995 | Demmel |
| 5,424,151 A | 6/1995 | Koksbang et al. |
| 5,426,055 A | 6/1995 | Chang et al. |
| 5,429,890 A | 7/1995 | Pynenburg et al. |
| 5,432,425 A | 7/1995 | Lundquist et al. |
| 5,435,054 A | 7/1995 | Tonder et al. |
| 5,436,091 A | 7/1995 | Shackle et al. |
| 5,436,549 A | 7/1995 | Lundquist et al. |
| 5,438,249 A | 8/1995 | Chang et al. |
| 5,443,809 A | 8/1995 | Olsen |
| 5,478,673 A | 12/1995 | Funatsu |
| 5,478,676 A | 12/1995 | Turi et al. |
| 5,482,587 A | 1/1996 | McAleavey |
| 5,482,697 A | 1/1996 | Saidi |
| 5,503,814 A | 4/1996 | Demmel |
| 5,545,604 A | 8/1996 | Demmel |
| 5,584,893 A | 12/1996 | Mitchell |
| 5,587,133 A | 12/1996 | Amatucci et al. |
| 5,595,837 A | 1/1997 | Olsen et al. |
| 5,597,662 A | 1/1997 | Isaacson et al. |
| 5,605,550 A | 2/1997 | Jensen et al. |
| 5,612,153 A | 3/1997 | Moulton et al. |
| 5,616,152 A | 4/1997 | Velasquez et al. |
| 5,616,309 A | 4/1997 | Zachau-Christiansen et al. |
| 5,616,366 A | 4/1997 | Olsen et al. |
| 5,616,437 A | 4/1997 | Gao |
| 5,618,406 A | 4/1997 | Demmel |
| 5,620,810 A | 4/1997 | Golovin et al. |
| 5,622,791 A | 4/1997 | Shackle |
| 5,630,993 A | 5/1997 | Amatucci et al. |
| 5,635,138 A | 6/1997 | Amatucci et al. |
| 5,643,665 A | 7/1997 | Saidi |
| 5,643,695 A | 7/1997 | Barker et al. |
| 5,648,185 A | 7/1997 | Chaloner-Gill et al. |
| 5,652,072 A | 7/1997 | Lamanna et al. |
| 5,654,114 A | 8/1997 | Kubota et al. |
| 5,656,326 A | 8/1997 | Mallinson |
| 5,656,394 A | 8/1997 | Koksbang et al. |
| 5,660,948 A | 8/1997 | Barker |
| 5,670,272 A | 9/1997 | Cheu et al. |
| 5,670,273 A | 9/1997 | Velasquez et al. |
| 5,670,277 A | 9/1997 | Barker et al. |
| 5,672,446 A | 9/1997 | Barker et al. |
| 5,674,641 A | 10/1997 | Cheu |
| 5,674,645 A | 10/1997 | Amatucci et al. |
| 5,690,703 A | 11/1997 | Mitchell et al. |
| 5,691,081 A | 11/1997 | Krause et al. |
| 5,693,435 A | 12/1997 | Amatucci et al. |
| 5,695,887 A | 12/1997 | Amatucci et al. |
| 5,698,338 A | 12/1997 | Barker et al. |
| 5,700,298 A | 12/1997 | Shi et al. |
| 5,700,300 A | 12/1997 | Jensen et al. |
| 5,705,291 A | 1/1998 | Amatucci et al. |
| 5,707,715 A | 1/1998 | deRoachemont et al. |
| 5,707,760 A | 1/1998 | Stux et al. |
| 5,712,059 A | 1/1998 | Barker et al. |
| 5,714,278 A | 2/1998 | Mallinson |
| 5,720,780 A | 2/1998 | Liu et al. |
| 5,728,489 A | 3/1998 | Gao et al. |
| 5,738,691 A | 4/1998 | Barker et al. |
| 5,744,264 A | 4/1998 | Barker |
| 5,744,265 A | 4/1998 | Barker et al. |
| 5,746,781 A | 5/1998 | Velasquez et al. |
| 5,747,189 A | 5/1998 | Perkins |
| 5,753,388 A | 5/1998 | Koksbang et al. |
| 5,756,230 A | 5/1998 | Gao et al. |
| 5,759,715 A | 6/1998 | Barker et al. |
| 5,759,720 A | 6/1998 | Amatucci |
| 5,763,120 A | 6/1998 | Saidi et al. |
| 5,770,018 A | 6/1998 | Saidi |
| 5,770,331 A | 6/1998 | Olsen et al. |
| 5,772,702 A | 6/1998 | Barker et al. |
| 5,772,703 A | 6/1998 | Guindy |
| 5,773,168 A | 6/1998 | Kubo et al. |
| 5,776,637 A | 7/1998 | Kashio et al. |
| 5,778,515 A | 7/1998 | Menon |
| 5,780,182 A | 7/1998 | Barker et al. |
| 5,789,110 A | 8/1998 | Saidi et al. |
| 5,824,120 A | 10/1998 | Mitchell et al. |
| 5,824,285 A | 10/1998 | Koksbang |
| 5,830,602 A | 11/1998 | Barker et al. |
| 5,834,136 A | 11/1998 | Gao et al. |
| 5,843,592 A | 12/1998 | Barker et al. |
| 5,846,673 A | 12/1998 | Saidi et al. |
| 5,851,504 A | 12/1998 | Barker et al. |
| 5,851,696 A | 12/1998 | Saidi et al. |
| 5,858,573 A | 1/1999 | Abraham et al. |
| 5,861,224 A | 1/1999 | Barker et al. |
| 5,869,207 A | 2/1999 | Saidi et al. |
| 5,871,865 A | 2/1999 | Barker et al. |
| 5,871,866 A | 2/1999 | Barker et al. |
| 5,894,656 A | 4/1999 | Menon et al. |
| 5,902,697 A | 5/1999 | Guindy et al. |
| 5,908,716 A | 6/1999 | Barker |
| 5,916,515 A | 6/1999 | Bryan et al. |
| 5,916,516 A | 6/1999 | Kolb |
| 5,922,494 A | 7/1999 | Barker et al. |
| 5,932,374 A | 8/1999 | Amatucci |
| 5,939,043 A | 8/1999 | Yahagi |
| 5,943,851 A | 8/1999 | Matas Gabalda et al. |
| 5,950,412 A | 9/1999 | Gabalda et al. |
| 5,955,219 A | 9/1999 | Nishijima et al. |
| 5,961,671 A | 10/1999 | Guindy et al. |
| 5,962,170 A | 10/1999 | Mitchell |
| 5,964,903 A | 10/1999 | Gao et al. |
| 5,968,683 A | 10/1999 | Kolb |
| 5,972,055 A | 10/1999 | Gao et al. |
| 5,976,489 A | 11/1999 | Saidi et al. |
| 5,985,487 A | 11/1999 | Chaloner-Gill et al. |
| 5,991,878 A | 11/1999 | McDonough et al. |
| 6,004,697 A | 12/1999 | Thackeray et al. |
| 6,007,588 A | 12/1999 | Mitchell |
| 6,010,653 A | 1/2000 | Menon |
| 6,015,639 A | 1/2000 | Gao et al. |
| 6,019,144 A | 2/2000 | Moulton |
| 6,020,087 A | 2/2000 | Gao |
| 6,030,421 A | 2/2000 | Gauthier et al. |
| 6,033,804 A | 3/2000 | Doyle et al. |
| 6,037,095 A | 3/2000 | Miyasaka |
| 6,040,085 A | 3/2000 | Cheu et al. |
| 6,040,089 A | 3/2000 | Manev et al. |
| 6,042,966 A | 3/2000 | Cheu |
| 6,048,645 A | 4/2000 | Saidi et al. |
| 6,063,519 A | 5/2000 | Barker et al. |
| 6,066,305 A | 5/2000 | Dugger |
| 6,077,624 A | 6/2000 | Mitchell et al. |
| 6,085,015 A | 7/2000 | Armand et al. |
| 6,087,042 A | 7/2000 | Sugiyama et al. |
| 6,096,101 A | 8/2000 | Liu et al. |
| 6,099,960 A | 8/2000 | Tennent et al. |
| 6,100,324 A | 8/2000 | Choi et al. |
| 6,103,419 A | 8/2000 | Saidi et al. |
| 6,136,287 A | 10/2000 | Horne et al. |
| 6,136,472 A | 10/2000 | Barker et al. |
| 6,136,476 A | 10/2000 | Schutts et al. |
| 6,140,436 A | 10/2000 | Doyle et al. |
| 6,143,268 A | 11/2000 | Dahn et al. |
| 6,150,050 A | 11/2000 | Mathew et al. |
| 6,151,686 A | 11/2000 | McDonough et al. |
| 6,153,333 A | 11/2000 | Barker |
| 6,156,458 A | 12/2000 | Brodd et al. |
| 6,168,880 B1 | 1/2001 | Snyder et al. |
| 6,174,623 B1 | 1/2001 | Shackle |
| 6,174,627 B1 | 1/2001 | Ohta et al. |

(56) References Cited

U.S. PATENT DOCUMENTS

| | | |
|---|---|---|
| 6,181,545 B1 | 1/2001 | Amatucci et al. |
| RE37,076 E | 2/2001 | Barker |
| 6,183,718 B1 | 2/2001 | Barker et al. |
| 6,187,061 B1 | 2/2001 | Amatucci et al. |
| 6,198,623 B1 | 3/2001 | Amatucci |
| 6,203,946 B1 | 3/2001 | Barker et al. |
| 6,237,692 B1 | 5/2001 | Averhoff |
| 6,242,128 B1 | 6/2001 | Tura et al. |
| 6,252,762 B1 | 6/2001 | Amatucci |
| 6,265,100 B1 | 7/2001 | Saaski et al. |
| 6,267,943 B1 | 7/2001 | Manev et al. |
| 6,268,085 B1 | 7/2001 | Manthiram et al. |
| 6,269,884 B1 | 8/2001 | Averhoff |
| 6,277,521 B1 | 8/2001 | Gao et al. |
| 6,287,722 B1 | 9/2001 | Barton et al. |
| 6,291,097 B1 | 9/2001 | Barker et al. |
| 6,291,107 B1 | 9/2001 | Shimizu |
| 6,294,288 B1 | 9/2001 | Gross |
| 6,294,289 B1 | 9/2001 | Fanta et al. |
| 6,296,973 B1 | 10/2001 | Michot et al. |
| 6,306,215 B1 | 10/2001 | Larkin |
| 6,319,627 B1 | 11/2001 | Snyder et al. |
| 6,322,744 B1 | 11/2001 | Kelley et al. |
| 6,322,927 B1 | 11/2001 | Pistoia |
| 6,322,928 B1 | 11/2001 | Thackeray et al. |
| 6,328,770 B1 | 12/2001 | Gozdz |
| 6,331,282 B1 | 12/2001 | Manthiram et al. |
| 6,337,101 B1 | 1/2002 | Gozdz |
| 6,342,320 B2 | 1/2002 | Liu et al. |
| 6,354,377 B1 | 3/2002 | Averhoff |
| 6,361,755 B1 | 3/2002 | Manthiram et al. |
| 6,361,756 B1 | 3/2002 | Gao et al. |
| 6,361,902 B1 | 3/2002 | Brodd et al. |
| 6,365,018 B1 | 4/2002 | De Nora |
| 6,365,301 B1 | 4/2002 | Michot et al. |
| 6,372,388 B1 | 4/2002 | Katsurao et al. |
| 6,379,526 B1 | 4/2002 | De Nora et al. |
| 6,383,235 B1 | 5/2002 | Maegawa et al. |
| 6,383,682 B1 | 5/2002 | Amatucci |
| 6,387,568 B1 | 5/2002 | Barker et al. |
| 6,391,069 B1 | 5/2002 | Gozdz |
| 6,395,431 B1 | 5/2002 | Gao et al. |
| 6,413,667 B1 | 7/2002 | Gozdz |
| 6,413,673 B1 | 7/2002 | Kasai et al. |
| 6,413,676 B1 | 7/2002 | Munshi |
| 6,423,294 B2 | 7/2002 | Manev et al. |
| 6,425,992 B1 | 7/2002 | De Nora |
| 6,432,581 B1 | 8/2002 | Amatucci et al. |
| 6,436,155 B1 | 8/2002 | Gross |
| 6,444,354 B1 | 9/2002 | Warren |
| 6,444,369 B1 | 9/2002 | Kamino et al. |
| 6,444,370 B2 | 9/2002 | Barker et al. |
| 6,447,951 B1 | 9/2002 | Barker et al. |
| 6,451,486 B1 | 9/2002 | Davis et al. |
| 6,452,217 B1 | 9/2002 | Wojnarowski et al. |
| 6,458,488 B1 | 10/2002 | Honbo et al. |
| 6,461,770 B1 | 10/2002 | Yoshimura et al. |
| 6,467,156 B1 | 10/2002 | Velazquez et al. |
| 6,467,761 B1 | 10/2002 | Amatucci et al. |
| 6,468,690 B1 | 10/2002 | Barker et al. |
| 6,468,695 B1 | 10/2002 | Barker |
| 6,482,374 B1 | 11/2002 | Kumar et al. |
| 6,482,540 B1 | 11/2002 | Gozdz et al. |
| 6,482,548 B2 | 11/2002 | Amatucci |
| 6,484,602 B1 | 11/2002 | Dagalakis et al. |
| 6,489,060 B1 | 12/2002 | Zhang et al. |
| 6,503,432 B1 | 1/2003 | Barton et al. |
| 6,506,493 B1 | 1/2003 | Kumar et al. |
| 6,514,640 B1 | 2/2003 | Armand et al. |
| 6,517,803 B2 | 2/2003 | Manev et al. |
| 6,517,972 B1 | 2/2003 | Amatucci |
| 6,521,116 B2 | 2/2003 | Duruz et al. |
| 6,524,741 B1 | 2/2003 | Bryan |
| 6,528,033 B1 | 3/2003 | Barker et al. |
| 6,533,909 B2 | 3/2003 | Duruz et al. |
| 6,537,334 B1 | 3/2003 | DuPasquier et al. |
| 6,537,698 B2 | 3/2003 | Gan et al. |
| 6,537,703 B2 | 3/2003 | DuPasquier et al. |
| 6,541,155 B2 | 4/2003 | Guindy et al. |
| 6,551,571 B2 | 4/2003 | Fujino et al. |
| 6,555,026 B1 | 4/2003 | Barker et al. |
| 6,562,761 B2 | 5/2003 | Fritzemeier et al. |
| 6,579,475 B2 | 6/2003 | Gao et al. |
| 6,579,643 B1 | 6/2003 | Gozdz |
| 6,582,852 B1 | 6/2003 | Gao et al. |
| 6,586,135 B2 | 7/2003 | Gan et al. |
| 6,586,138 B2 | 7/2003 | Pekala et al. |
| 6,589,499 B2 | 7/2003 | Gao et al. |
| 6,589,697 B2 | 7/2003 | Yoshimura et al. |
| 6,596,435 B2 | 7/2003 | Kelley et al. |
| 6,599,662 B1 | 7/2003 | Chiang et al. |
| 6,607,706 B1 | 8/2003 | Kumar et al. |
| 6,610,223 B2 | 8/2003 | Lee |
| 6,613,479 B2 | 9/2003 | Fukuzawa et al. |
| 6,620,400 B2 | 9/2003 | Gao et al. |
| 6,620,543 B2 | 9/2003 | Li |
| 6,620,553 B2 | 9/2003 | Shiga et al. |
| 6,620,899 B1 | 9/2003 | Morken et al. |
| 6,627,337 B2 | 9/2003 | Gan et al. |
| 6,631,424 B1 | 10/2003 | McDonough et al. |
| 6,645,452 B1 | 11/2003 | Barker et al. |
| 6,653,020 B2 | 11/2003 | Amatucci et al. |
| 6,656,520 B2 | 12/2003 | De Nora |
| 6,667,377 B2 | 12/2003 | Feiring et al. |
| 6,667,599 B2 | 12/2003 | Stone et al. |
| 6,680,041 B1 | 1/2004 | Kumar et al. |
| 6,702,961 B2 | 3/2004 | Barker et al. |
| 6,706,445 B2 | 3/2004 | Barker et al. |
| 6,713,039 B2 | 3/2004 | Tabata et al. |
| 6,716,372 B2 | 4/2004 | Barker et al. |
| 6,720,110 B2 | 4/2004 | Barker et al. |
| 6,720,111 B2 | 4/2004 | Tabuchi et al. |
| 6,720,112 B2 | 4/2004 | Barker et al. |
| 6,723,470 B2 | 4/2004 | Barker et al. |
| 6,724,173 B2 | 4/2004 | Cummings |
| 6,730,281 B2 | 5/2004 | Barker et al. |
| 6,749,648 B1 | 6/2004 | Kumar et al. |
| 6,753,108 B1 | 6/2004 | Hampden-Smith et al. |
| 6,765,368 B2 | 7/2004 | Stone et al. |
| 6,770,398 B1 | 8/2004 | Atwater et al. |
| 6,773,849 B2 | 8/2004 | Itoh et al. |
| 6,773,851 B1 | 8/2004 | Ferrando et al. |
| 6,777,132 B2 | 8/2004 | Barker et al. |
| 6,783,888 B2 | 8/2004 | Gan et al. |
| 6,790,243 B2 | 9/2004 | Vaidyanathan |
| 6,794,084 B2 | 9/2004 | Adamson et al. |
| 6,794,085 B2 | 9/2004 | Gao et al. |
| 6,798,170 B2 | 9/2004 | Cummings |
| 6,808,849 B2 | 10/2004 | Ehrlich |
| 6,809,500 B2 | 10/2004 | Cummings |
| 6,815,122 B2 | 11/2004 | Barker et al. |
| 6,828,065 B2 | 12/2004 | Munshi |
| 6,830,822 B2 | 12/2004 | Yadav |
| 6,835,914 B2 | 12/2004 | Timans |
| 6,841,304 B2 | 1/2005 | Michot et al. |
| 6,849,109 B2 | 2/2005 | Yadav et al. |
| 6,855,273 B2 | 2/2005 | Ravet et al. |
| 6,855,462 B2 | 2/2005 | Barker et al. |
| 6,869,547 B2 | 3/2005 | Barker et al. |
| 6,872,492 B2 | 3/2005 | Barker et al. |
| 6,884,544 B2 | 4/2005 | Barker et al. |
| 6,890,686 B1 | 5/2005 | Barker |
| 6,908,710 B2 | 6/2005 | Barker et al. |
| 6,908,711 B2 | 6/2005 | Fauteux et al. |
| 6,913,682 B2 | 7/2005 | Duruz et al. |
| 6,913,855 B2 | 7/2005 | Stoker et al. |
| 6,914,417 B2 | 7/2005 | Cummings |
| 6,916,872 B2 | 7/2005 | Yadav et al. |
| 6,919,708 B2 | 7/2005 | Cummings |
| 6,932,922 B2 | 8/2005 | Gao et al. |
| 6,933,078 B2 | 8/2005 | Huang et al. |
| 6,960,331 B2 | 11/2005 | Barker et al. |
| 6,960,335 B1 | 11/2005 | Singhal et al. |
| 6,962,666 B2 | 11/2005 | Ravet et al. |

(56) References Cited

U.S. PATENT DOCUMENTS

| | | | |
|---|---|---|---|
| 6,964,827 B2 | 11/2005 | Barker et al. |
| 6,974,486 B1 | 12/2005 | Kweon et al. |
| 6,986,967 B2 | 1/2006 | Barton et al. |
| 6,991,754 B2 | 1/2006 | Hampden-Smith et al. |
| 6,998,071 B2 | 2/2006 | Maeda et al. |
| 6,998,465 B2 | 2/2006 | Yokoyama et al. |
| 7,001,690 B2 | 2/2006 | Barker et al. |
| 7,008,566 B2 | 3/2006 | Barker et al. |
| 7,008,722 B2 | 3/2006 | Huang |
| 7,008,726 B2 | 3/2006 | Adamson et al. |
| 7,014,954 B2 | 3/2006 | Yamaguchi et al. |
| 7,019,487 B2 | 3/2006 | Cummings |
| 7,026,069 B1 | 4/2006 | Atwater et al. |
| 7,026,071 B2 | 4/2006 | Mayes et al. |
| 7,026,072 B2 | 4/2006 | Barker et al. |
| 7,041,239 B2 | 5/2006 | Barker et al. |
| 7,060,206 B2 | 6/2006 | Barker et al. |
| 7,060,238 B2 | 6/2006 | Saidi et al. |
| 7,071,346 B2 | 7/2006 | Morken et al. |
| 7,074,382 B2 | 7/2006 | Gao et al. |
| 7,087,341 B2 | 8/2006 | Hampden-Smith et al. |
| 7,087,346 B2 | 8/2006 | Barker et al. |
| 7,095,051 B2 | 8/2006 | Nagahama et al. |
| 7,112,291 B2 | 9/2006 | Maeda et al. |
| 7,129,383 B2 | 10/2006 | Nappa et al. |
| 7,135,656 B2 | 11/2006 | Timans |
| 7,141,148 B2 | 11/2006 | Julsrud et al. |
| 7,148,613 B2 | 12/2006 | Dally et al. |
| 7,163,768 B2 | 1/2007 | Utsugi et al. |
| 7,205,067 B2 | 4/2007 | Godevais et al. |
| 7,211,325 B2 | 5/2007 | Villalobos et al. |
| 7,211,349 B2 | 5/2007 | Leising et al. |
| 7,211,350 B2 | 5/2007 | Amatucci |
| 7,214,448 B2 | 5/2007 | Barker et al. |
| 7,217,476 B2 | 5/2007 | Omaru |
| 7,217,678 B2 | 5/2007 | Rao et al. |
| 7,229,717 B2 | 6/2007 | Yamaguchi et al. |
| 7,261,977 B2 | 8/2007 | Barker et al. |
| 7,270,915 B2 | 9/2007 | Barker et al. |
| 7,276,218 B2 | 10/2007 | Barker et al. |
| 7,294,435 B2 | 11/2007 | Miyamoto et al. |
| 7,304,201 B2 | 12/2007 | Holloway et al. |
| 7,307,831 B2 | 12/2007 | Tanaka et al. |
| 7,309,545 B2 | 12/2007 | Tanizaki et al. |
| 7,311,993 B2 | 12/2007 | Ivanov et al. |
| 7,312,000 B2 | 12/2007 | Iriyama et al. |
| 7,314,682 B2 | 1/2008 | Thackeray et al. |
| 7,316,862 B2 | 1/2008 | Uchitomi et al. |
| 7,318,981 B2 | 1/2008 | Iwasa et al. |
| 7,318,983 B2 | 1/2008 | Adachi et al. |
| 7,320,846 B2 | 1/2008 | Watanabe et al. |
| 7,323,158 B2 | 1/2008 | Kumar et al. |
| 7,326,491 B2 | 2/2008 | Takahashi et al. |
| 7,326,493 B2 | 2/2008 | Martinet et al. |
| 7,335,444 B2 | 2/2008 | Numata et al. |
| 7,337,010 B2 | 2/2008 | Howard et al. |
| 7,338,647 B2 | 3/2008 | Huang et al. |
| 7,341,805 B2 | 3/2008 | Ueda et al. |
| 7,342,706 B2 | 3/2008 | Shinohara et al. |
| 7,344,659 B2 | 3/2008 | Ravet et al. |
| 7,344,776 B2 | 3/2008 | Kollmann et al. |
| 7,348,100 B2 | 3/2008 | Adamson et al. |
| 7,348,103 B2 | 3/2008 | Ivanov et al. |
| 7,351,499 B2 | 4/2008 | Iltchev et al. |
| 7,351,500 B2 | 4/2008 | Ueda et al. |
| 7,355,238 B2 | 4/2008 | Takata et al. |
| 7,358,009 B2 | 4/2008 | Johnson et al. |
| 7,358,462 B2 | 4/2008 | Timans |
| 2002/0160253 A1 | 10/2002 | Vaidyanathan |
| 2004/0191633 A1 | 9/2004 | Johnson et al. |
| 2004/0265695 A1 | 12/2004 | Barker et al. |
| 2006/0188781 A1* | 8/2006 | Thackeray et al. ........ 429/231.1 |

FOREIGN PATENT DOCUMENTS

| | | |
|---|---|---|
| JP | 7-37617 | 2/1995 |
| JP | 254403 | 10/1995 |
| JP | 8-171900 | 7/1996 |
| JP | 8-297422 | 10/1996 |
| JP | 9-286150 | 10/1997 |
| JP | 10-334918 | 12/1998 |
| WO | WO 99/49527 | 9/1999 |

OTHER PUBLICATIONS

Kang et al., Structural and electrochemical study of Li—Al—Mn—O—F spinel material for lithium secondary batteries, 2005, Journal of Power Sources, 146, pp. 237-240.*

Kang et al., Journal of Power Sources 146 (2005) pp. 237-240.*

Amatucci et al., Journal of Power Sources 81-82 (1999) pp. 39-43.*

Youngjoon, Shin, Enhancement of the Electrochemical Properties of Li1Mn2O4 Through Chemical Substitution, 81 82 J. Power Sources 39 (1999).*

Amatucci et al., "Failure Mechanism and Improvement of the Elevated Temperature Cycling of $LiMn_2O_4$ Compounds through the Use of the $LiAl_xMn_{2-x}O_{4-z}F_z$ Solid Solution," J. Electrochem. Soc., 148(2):A171-A182, (2001).

Amatucci et al., "Enhancement of the electrochemical properties of $Li_1Mn_2)0_4$ through chemical substitution," J. Power Sources, 81-82:39-43, (1999).

Amatucci et al., "The elevated temperature performance of the $LiMn_2O_4$/C system: failure and solutions," Electrochimica Acta 45:255-271, (1999).

Chebiam et al., "Soft Chemistry Synthesis and Characterization of Layered $Li_{1-x}Ni_{1-y}Co_yO_{2-\delta}$ ($0 \le x \le 1$ and $0 \le y \le 1$)," Chem. Mater., 13:2951-2957, (2001).

Choi et al., "Proton Insertion into Oxide Cathodes during Chemical Delithiation," Electrochem. And Solid-State Letters, 9(5):A241-A244, (2006).

Choi and Manthiram, "Influence of fluorine substitution on the electrochemical performance of 3 V spinel $Li_4Mn_5O_{12-\eta}F_\eta$ cathodes," Solid State Ionics, 178:1541-1545, (2007).

Choi and Manthiram, Influence of Fluorine on the Electrochemical Performance of Spinel $LiMn_{2-y-z}Li_yZn_zO_{4-\eta}F_\eta$ Cathodes, J. Electrochemical Soc. 154(7):A614-A618, (2007).

Choi and Manthiram, "Superior Capacity Retention Spinel Oxyfluoride Cathodes for Lithium-Ion Batteries," Electrochemical and Solid-State Letters, 9(5):A245-A248, (2006).

Choi and Manthiram, "Factors Controlling the Fluorine Content and the Electrochemical Performance of Spinel Oxyfluoride Cathodes," J. Electrochemical Soc. 154(8):A792-A797, (2007).

Huang et al., "Correlating Capacity Loss of Stoichiometric and Nonstoichiometric Lithium Manganese Oxide Spinel Electrodes with Their Structural Integrity," J. Electrochem. Soc., 146(10):3649-3654, (1999).

Inoue and Sano, "An Investigation of Capacity Fading of Manganese Spinels Stored at Elevated Temperature," J. Electrochem. Soc., 145(11):3704-3707 (1998).

Jang et al., "Dissolution of Spinel Oxides and Capacity Losses in 4 V $Li/Li_xMn_2O_4$ Cells," J. Electrochem. Soc., 143(7):2204-2211, (1996).

Kang and Amine, "Layered $Li(Li_{0.2}Ni_{0.15+0.5z}Co_{0.10}Mn_{0.55-0.5z})O_{2-z}F_z$ cathode materials for Li-ion secondary batteries," J. Power Sources, 146:654-657, (2005).

Kang et al., "Effect of fluorine on the electrochemical proprties of layered $Li(Ni_{0.5}Mn_{0.5})O_2$ cathode materials," J. Power Sources, 146:650-653, (2005).

Kang et al., "Structural and electrochemical study of Li—Al—Mn—O—F spinel material for lithium secondary batteries," J. Power Sources, 146:237-240, (2005).

Kim et al., "Improvement of High-Voltage Cycling Behavior of Surface-Modified $Li[Ni_{1/3}Co_{1/3}Mn_{1/3}]O_2$ Cathodes by Fluorine Substitution for Li-Ion Batteries," J. Electrochem. Soc., 152(9):A1707-A1713, (2005).

(56) References Cited

OTHER PUBLICATIONS

Lee et al., "Degradation mechanisms in doped spinels of $LiM_{0.05}Mn_{1.95}O_4$ (M = Li, B, Al, Co, and Ni) for Li secondary batteries," J. Power Sources, 89:7-14, (2000).

Luo et al., "On the incorporation of fluorine into the manganese spinel cathode lattice," Solid State Ionics, 703-707, (2009).

Manthiram, "Cathodes-Superior Capacity Retention, High-Rate Spinel Manganese Oxide Compositions," Second-quarter FY 2005 report for the Batteries for Advanced Transpiortation Technologies (BATT) Program, p. 33-34, (Apr. 28, 2005).

Manthiram and Choi, "Suppression of Mn Dissolution in Spinel Cathodes by Trapping the Protons within Layered Oxide Cathodes," Electrochemical and Solid-State Letters, 10(9):A228-A231, (2007).

Shin, "Capacity Fading Mechanisms and Origin of the Capacity Above 4.5 V of Spinel Lithium Manganese Oxides," Dissertation Presented to the Faculty of the Graduate School of the University of Texas at Austin, Aug. 2003.

Shin and Manthiram, "Microstrain and Capacity Fade in Spinel Manganese Oxides," Electrochem. Solid-State Left. 5(3):A55-A58, (2002).

Shin and Manthiram, "High Rate, Superior Capacity Retention $LiMn_{2-2y}Li_yNi_yO_4$ Spinel Cathodes for Lithium-Ion Batteries," Electrochem. Solid-State Lett. 6(2):A34-A36, (2003).

Shin and Manthiram, "Influence of the Lattice Parameter Difference between the Two Cubic Phases Formed in the 4 V Region on the Capacity Fading of Spinel Manganese Oxides," Chem. Mater., 15:2954-2961, (2003).

Shin and Manthiram, "Factors Influencing the Capacity Fade of Spinel Lithium Manganese Oxides," J. Electrochem. Soc. 151(2):A204-A208, (2004).

Son and Kim, "New investigation of fluorine-substituted spinel $LiMn_2O_{4-x}F_x$ by using sol-gel process," J. Power Sources, 147:220-226, (2005).

Thackeray et al., "Structural Fatigue in Spinel Electrodes in High Voltage (4V) $Li/Li_xMn_2O_4$ Cells," Electrochem. Solid-State Lett., 1(7):7-9, (1998).

Wu and Manthiram, "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochem. And Solid-State Ltrs., 9(5):A221-A224, (2006).

Wu and Manthiram, "Effect of $Al^{3+}$ and $F^-$ Doping on the Irreversible Oxygen Loss from Layered $Li[Li_{0.17}Mn_{0.58}Ni_{0.25}]O_2$ Cathodes," Electrochem. And Solid-State Ltrs., 10(6):A151-A154, (2007).

Xia and Yoshio, "An Investigation of Lithium Ion Insertion into Spinel Structure Li—Mn—O Compounds," J. Electrochem. Soc., 143(3):825-833, (1996).

Yamane et al., "A casual study of the capacity fading of $Li_{1.01}Mn_{1.99}O_4$ cathode at 80° C., and the suppressing substances of its fading," J. Power sources, 99:60-65, (2001).

English translation of Office Action issued by the State Intellectual Property Office of the People's Republic of China for corresponding Chinese application No. 200780043642.8, dated Jan. 20, 2011.

\* cited by examiner

CATION-SUBSTITUTED SPINEL OXIDE AND OXYFLUORIDE CATHODES FOR LITHIUM ION BATTERIES

CROSS-REFERENCE TO RELATED APPLICATIONS

This application is a divisional application of, and claims priority under 35 U.S.C. §120, to U.S. application Ser. No. 11/861,252, filed on Sep. 25, 2007, which claims priority to U.S. Provisional Application Ser. No. 60/846,974, filed Sep. 25, 2006, the contents of both applications are incorporated by their entirety.

STATEMENT OF FEDERALLY FUNDED RESEARCH

This invention was made with U.S. Government support under Contract No. DE-AC03-765F00098 (Subcontract No. 6712770) awarded by the U.S. Department of Energy. The government may have certain rights in this invention.

TECHNICAL FIELD OF THE INVENTION

The present invention relates in general to the field of lithium-ion cathode materials, more particularly to cation-substituted spinel oxide cathodes having substitutions of fluoride ion for oxide ion.

BACKGROUND OF THE INVENTION

Without limiting the scope of the invention, its background is described in connection with lithium ion batteries.

Generally, lithium ion batteries transport lithium ions between the anode and cathode with the simultaneous oxidation or reduction of the host electrodes, respectively. Cathode materials common in the art include transition metal oxides containing lithium, e.g., layered lithium cobalt oxide ($LiCoO_2$), spinel lithium manganese oxide ($LiMn_2O_4$), and olivine lithium iron phosphate ($LiFePO_4$). For example, lithium ion batteries use layered lithium cobalt oxide cathodes; however, these materials are expensive and environmentally unfriendly due to their cobalt content. As a result, alternative materials are being developed as electrodes that have the desired discharge capacity, which is related to the amount of lithium that can be reversibly extracted, and discharge voltage, which depends on the transition metal ion and crystal structure.

For example, common electrode materials include spinel $LiMn_2O_4$ and olivine $LiFePO_4$ that include Mn and Fe respectively, and hence are inexpensive and environmentally benign. However, the spinel $LiMn_2O_4$ cathode has been plagued by severe capacity fade at elevated temperatures.[1-7] The spinel electrodes are unstable in the cell environment, and particularly unstable when operated at temperatures above room temperature.

The capacity fade is generally thought to be due to the dissolution of manganese from the lattice into the electrolyte and then into the carbon anode. Alternative spinel compositions achieved through cationic substitutions have been pursued, but they could not completely overcome the capacity fade problem.

In addition, the process of synthesizing the spinel structure and chemical substitutions could result in local defects and microstructural differences that could influence the electrochemical performance factors including capacity retention, rate (power) capability, and storage characteristics.

For example, U.S. Pat. No. 5,674,645 (the '645 patent) entitled "Lithium Manganese Oxy-Fluorides for Li-Ion Rechargeable Battery Electrodes" issued to Amatucci, et al. on Oct. 7, 1997. The '645 patent discloses that the cycling stability and capacity of Li-ion rechargeable batteries are improved by the use of lithium manganese oxy-fluoride electrode component intercalation materials having the general formula, $Li_{1+x}M_yMn_{2-x-y}O_{4-z}F_z$, where M is a transition metal, e.g., Co, Cr, or Fe.

Similarly, U.S. Pat. No. 6,087,042, entitled, "Positive Electrode Material for Secondary Lithium Battery" issued to Sugiyama, et al. discloses a positive electrode material for a secondary lithium battery excellent in high temperature cycle characteristics which is a lithium manganese oxyfluoride having a spinel structure, wherein the oxyfluoride has a composition represented by the composition formula $Li_{1+x}Mn_{2-x}O_{4-y}F_z$: wherein x represents a number from 0.0133 to 0.3333; y represents a number from 0 to 0.2 (exclusive of 0); and z represents a number of from 0.01 to 0.2 (exclusive of 0.01), with the proviso that (y−z) is more than 0 but not more than 0.07. The positive electrode material for a secondary lithium battery of is said to exhibit not only a high cycle durability of charge/discharge but also a minimum drop of a charge/discharge initial capacity to provide a high energy density.

SUMMARY OF THE INVENTION

The present inventors recognized that the current method of making a fluorine-substituted oxyfluorides composition were inadequate in that they did not teach the compositions of the present invention and could not be used to incorporate the desired fluorine content to make the compositions of the present invention.

The present inventors recognized that the cyclability at elevated temperatures, rate capability, and storage characteristics could be improved significantly by reducing the lattice parameter difference $\Delta a$ between the two cubic phases formed during cycling by appropriate cationic substitutions.[8-11] However, cationic substitutions generally leads to a decrease in the reversible capacity values, which may make the cation-substituted spinel compositions unattractive for practical applications.

The present inventors recognized that the substitution of fluoride ion for oxide ion in cation-substituted spinel oxide cathodes increased the reversible capacity due to a decrease in the oxidation state of Mn. In addition, the present inventors recognized that the cyclability at elevated temperatures, the rate capability, and the storage characteristics could be improved significantly by reducing the lattice parameter difference $\Delta a$ between the two cubic phases formed during cycling by appropriate cationic substitutions.

The present inventors recognized a need to increase the reversible capacity, while preserving the other electrochemical performance features. The present inventors used the partial substitution of fluoride ions for oxide ions in the cation-substituted spinel oxides to obtain the corresponding spinel oxyfluoride cathodes. In order to maximize the fluorine content in the spinel lattice, the present inventors developed a low temperature procedure involving the firing of the already synthesized cation-substituted spinel oxides $LiMn_{2-y-z}Li_yM_zO_4$ with ammonium hydrogen fluoride ($NH_4HF_2$) at a low temperature of 450° C. for a short period.

The present invention provides a method of making fluorine-substituted oxyfluoride compositions by firing a $LiMn_{2-y-z}Li_yM_zO_4$ oxide with $NH_4HF_2$ at a temperature within the range of about 200 to about 700° C. for 2 to 8 hours to form a cation-substituted, fluorine-substituted $LiMn_{2-y-z}Li_yM_zO_{4-\eta}F_\eta$ spinel oxide structure. Generally, M may be Mg, Al, Ti, V, Cr, Fe, Co, Ni, Cu, Zn, Zr, Nb, Mo, Ga, Sn, or combinations thereof. The fluorine incorporated into the spinel lattice in the cation-substituted, fluorine-substituted $LiMn_{2-y-z}Li_yM_zO_{4-\eta}F_\eta$ spinel structure is between about $\eta=0$ and $\eta=0.30$. Some specific, non-limiting examples of compositions having the cation-substituted, fluorine-substituted $LiMn_{2-y-z}Li_yM_zO_{4-\eta}F_\eta$ spinel structure include $LiMn_{1.8}Li_{0.2}O_{3.88}F_{0.12}$, $LiMn_{1.8}Li_{0.2}O_{3.79}F_{0.21}$, $LiMn_{1.8}Li_{0.1}Ti_{0.1}O_{3.9}F_{0.1}$, $LiMn_{1.8}Li_{0.1}Cu_{0.1}O_{3.9}F_{0.1}$, $LiMn_{1.8}Li_{0.1}Ni_{0.1}O_{3.9}F_{0.1}$, or $LiMn_{1.8}Li_{0.1}Ni_{0.1}O_{3.8}F_{0.2}$.

The present invention also provides a lithium cathode composition having a cation-substituted, fluorine-substituted $LiMn_{2-y-z}Li_yM_zO_{4-\eta}F_\eta$ composition with a spinel crystal structure. M may be Mg, Al, Ti, V, Cr, Fe, Co, Ni, Cu, Zn, Zr, Nb, Mo, Ga, Sn, or combinations thereof.

Furthermore, the present invention provides a method of making a spinel cathode by mixing a $LiMn_{2-y-z}Li_yM_zO_{4-\eta}F_\eta$ composition with a conductive diluent and a binder to form a cation-substituted fluorine-substituted $LiMn_{2-y-z}Li_yM_zO_{4-\eta}F_\eta$ composition. The cation-substituted fluorine-substituted $LiMn_{2-y-z}Li_yM_zO_{4-\eta}F_\eta$ composition can then be formed into a cathode shape, e.g., generally cylindrical or generally disk shaped.

One example of the spinel cathode includes a binder of powdered polytetrafluoroethylene at about 1 to about 10 weight percent of the cathode mixture, a conductive diluent of acetylene black at about 5 to about 25 weight percent of the cathode mixture and the $LiMn_{2-y-z}Li_yM_zO_{4-\eta}F_\eta$ powder composition of about 70 to about 95 weight percent of the cathode mixture.

The present invention also provides a mixed cathode consisting of a spinel and layered oxide. The cathode includes a mixture of a cation-substituted spinel oxide material and a layered oxide material. In some instances, the cation-substituted spinel oxide material is also fluorine-substituted, e.g., $LiMn_{2-y-z}Li_yM_zO_{4-\eta}F_\eta$ where y is within the range of about 0 to about 0.3, z is within the range of about 0 to about 1.0, and $\eta$ is within the range of about 0 to about 0.5. The mixture may contain between about 20 weight percent and about 95 weight percent of the cation-substituted spinel oxide or oxyfluoride and between about 80 weight percent and about 5 weight percent for the layered oxide material (e.g., between about 70 weight percent and about 80 weight percent $LiMn_{1.85}Li_{0.075}Ni_{0.04}Al_{0.035}O_4$ and between about 20 weight percent and about 30 weight percent $LiCoO_2$, or between about 70 weight percent and about 80 weight percent $LiMn_{1.8}Li_{0.1}Ni_{0.1}O_{3.8}F_{0.2}$ and between about 20 weight percent and about 30 weight percent $LiCoO_2$.

The present invention also provides a carbon anode surface modification having a spinel $Li_4Ti_5O_{12}$ or $TiO_2$ coating in contact with the carbon anode surface. Both $Li_4Ti_5O_{12}$ and $TiO_2$ offer the advantage of contributing capacities to the anode. The skilled artisan will recognize that other oxides or conductive polymers that may or may not contribute capacity may also be used, e.g., oxides of Mg, Al, Si, V, Cr, Fe, Co, Ni, Cu, Zn, Ga, Ge, Y, Zr, Nb, Mo, Cd, In, Sn, Sb, La, Ce, Hf, Ta, W, Bi and combinations thereof and polyaniline, polypyrrole, polythiophene, polyphenol, polyacetylene, polyphenylene and combinations thereof.

A method of making a spinel and layered oxide cathode is also provided. The cathode is formed from a mixture of a cation-substituted spinel oxide material and a layered oxide material. In some instances, the cation-substituted spinel oxide material is also fluorine-substituted, and has the composition $LiMn_{2-y-z}Li_yM_zO_{4-\eta}F_\eta$ where y is within the range of about 0 to about 0.3, z is within the range of about 0 to about 1.0, and $\eta$ is within the range of about 0 to about 0.5. The mixture may contain between about 60 weight percent and about 90 weight percent of the cation-substituted spinel oxide and between about 40 weight percent and about 10 weight percent of the layered oxide material (e.g., between about 70 weight percent and about 80 weight percent $LiMn_{1.85}Li_{0.075}Ni_{0.04}Al_{0.035}O_4$ and between about 20 weight percent and about 30 weight percent $LiCoO_2$, or between about 70 weight percent and about 80 weight percent $LiMn_{1.8}Li_{0.1}Ni_{0.1}O_{3.8}F_{0.2}$ and between about 20 weight percent and about 30 weight percent $LiCoO_2$).

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
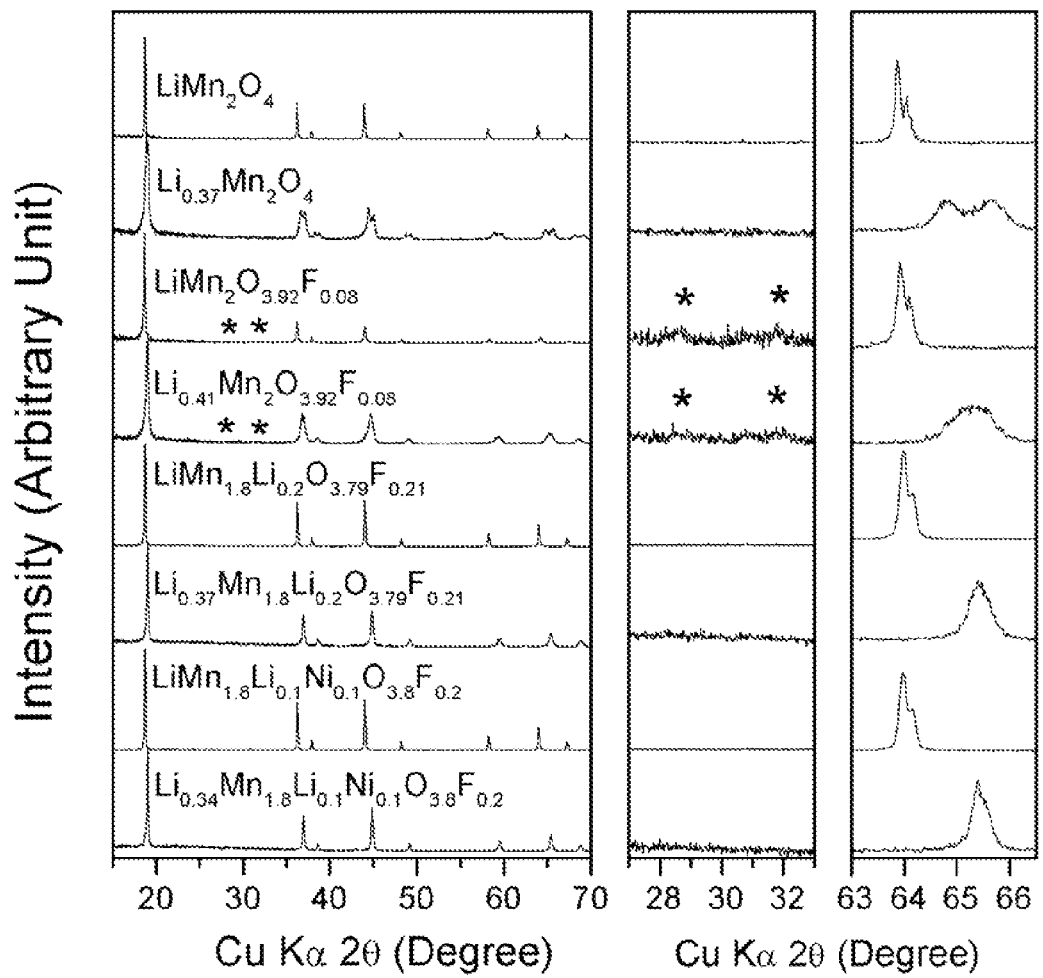
FIG. 1 is the X-ray diffraction patterns of selected parent $LiMn_{2-y-z}Li_yM_zO_{4-\eta}F_\eta$ and chemically delithiated $Li_{1-x}Mn_{2-y-z}Li_yM_zO_{4-\eta}F_\eta$ spinel cathodes.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present inventors recognized a need for $Li_{1+x}M_yMn_{2-x-y}O_{4-z}F_z$ (and specifically, $LiMn_{1.8}Li_{0.1}Ni_{0.1}O_{4-\eta}F_\eta$) compositions, methods of using the composition (cells, batteries, etc.) and methods of making the compositions. Existing references fail to teach $Li_{1+x}M_yMn_{2-x-y}O_{4-z}F_z$ (and specifically, $LiMn_{1.8}Li_{0.1}Ni_{0.1}O_{4-\eta}F_\eta$) compositions, method of making or using. Although the '645 patent states that compositions of $Li_{1+x}M_yMn_{2-x-y}O_{4-z}F_z$, where M is a transition metal can be made the present inventors also recognized that, the '645 patent does not teach or enable the making of the compositions of the present invention.

For example, the present inventors recognized that the '645 patent claims a lithium manganese oxy-fluoride compound having the general formula, $Li_{1+x}M_yMn_{2-x-y}O_{4-z}F_z$, where $x \leq 0.4$, $y \leq 0.3$, and $0.05 \leq z \leq 1.0$. The '645 patent claims M is a transition metal and further defines the transition metal as Co, Cr, or Fe. However, the present inventors recognized that the methods of the '645 patent do not teach the compositions of the present invention and the '645 patent cannot be used to make the present invention.

The present inventors have tried to synthesize $LiMn_{1.8}Li_{0.1}Ni_{0.1}O_{4-\eta}F_\eta$ by the procedure described in U.S. Pat. No. 5,674,645 (the '645 patent). The synthesis was carried out by heating required amounts of $Li_2CO_3$, LiF, $MnO_2$, and NiO at 800° C. in air for various nominal fluorine contents as described by the '645 patent. The samples were then characterized by X-ray diffraction, lithium content analysis by atomic absorption spectroscopy, and oxidation state analysis by a redox titration. The fluorine contents in the synthesized samples were calculated based on the experimental values of lithium content and oxidation state of manganese/nickel, employing charge neutrality principle and assuming the total anion (O+F) content to be 4.0. TABLE 1 compares the experimental compositions obtained based on these chemical analysis data with the nominal compositions. As seen, it is difficult to incorporate any fluorine into $LiMn_{1.8}Li_{0.1}Ni_{0.1}O_{4-\eta}F_\eta$ by the synthesis method described by the '645 patent. This is because LiF is volatile at the higher synthesis temperature of 800° C. used by the '645 patent. To overcome this problem and to maximize the fluorine content, the present inventors adopted a low temperature procedure in which the $LiMn_{1.8}Li_{0.1}Ni_{0.1}O_4$ oxide is synthesized first by firing at 800° C. and the oxide is then heat treated with $NH_4HF_2$ at a moderate temperature of 450° C. The low temperature process employed by the present inventors helps to increase the fluorine content in $LiMn_{1.8}Li_{0.1}Ni_{0.1}O_{4-\eta}F_\eta$.

| Sample # | Nominal composition | Experimental composition | Lattice parameter (Å) |
|---|---|---|---|
| 1 | $Li_{1.1}Mn_{1.8}Ni_{0.1}O_4$ | $Li_{1.10}Mn_{1.80}Ni_{0.1}O_4$ | 8.2046 |
| 1 | $Li_{1.1}Mn_{1.8}Ni_{0.1}O_{3.8}F_{0.2}$ | $Li_{1.06}Mn_{1.84}Ni_{0.1}O_4$ | 8.2062 |
| 2 | $Li_{1.1}Mn_{1.8}Ni_{0.1}O_{3.7}F_{0.3}$ | $Li_{1.04}Mn_{1.86}Ni_{0.1}O_4$ | 8.2086 |
| 3 | $Li_{1.1}Mn_{1.8}Ni_{0.1}O_{3.6}F_{0.4}$ | $Li_{1.03}Mn_{1.87}Ni_{0.1}O_4$ | 8.2181 |
| 4 | $Li_{1.1}Mn_{1.8}Ni_{0.1}O_{3.5}F_{0.5}$ | $Li_{1.01}Mn_{1.89}Ni_{0.1}O_4$ | 8.2208 |

TABLE 1 also gives the experimentally determined lattice parameters for various nominal fluorine contents in $LiMn_{1.8}Li_{0.1}Ni_{0.1}O_{4-\eta}F_\eta$. The lattice parameter increases with increasing nominal fluorine content, which is in general similar to that reported by the '645 patent. Although one may think that the observed increase in lattice parameter with increasing nominal fluorine content could be due to a substitution of monovalent F for divalent $O^{2-}$ and a consequent reduction of the smaller $Mn^{4+}$ ion to larger $Mn^{3+}$ ions, atomic absorption spectroscopy data indicate that the experimental value of lithium contents in the $LiMn_{1.8}Li_{0.1}Ni_{0.1}O_{4-\eta}F_\eta$ samples prepared by the method of the '645 patent are lower than the nominally expected lithium content values (TABLE 1). This is due to a volatilization of LiF itself at the high synthesis temperature of 800° C. employed by the '645 patent. The decrease in lithium content with increasing nominal fluorine content leads to a lowering of the oxidation state of manganese and a consequent increase in lattice parameter. Therefore, the observed increase in lattice parameter with increasing nominal fluorine content is not due to fluorine incorporation into the spinel lattice, but rather due to a volatilization of LiF. In contrast, our procedure involving the firing of already synthesized $LiMn_{1.8}Li_{0.1}Ni_{0.1}O_4$ oxide at a moderate temperature of 450° C. avoids such volatilization of lithium and helps to maximize the fluorine content in $LiMn_{1.8}Li_{0.1}Ni_{0.1}O_{4-\eta}F_\eta$.

In contrast to the '645 patent, the present invention overcomes these problems and maximizes the fluorine content, by using a low temperature procedure in which the $LiMn_{1.8}Li_{0.1}Ni_{0.1}O_4$ oxide is synthesized first by firing at about 800° C. and the oxide is then heat treated with $NH_4HF_2$ at a moderate temperature of about 450° C. The low temperature process employed by the present invention helps to increase the fluorine content in $LiMn_{1.8}Li_{0.1}Ni_{0.1}O_{4-\eta}F_\eta$.

It will thus be appreciated that the '645 patent fails to teach the compositions of the present invention, or the methods of making or using these compositions as disclosed herein.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "Ampere-hour (Ah)" refers to the units used in specifying the storage capacity of a battery. For example, a battery with 1 Ah capacity can supply a current of one ampere for one hour or 0.5 A for two hours, etc. 1 Ampere-hour (Ah) is the equivalent of 3600 coulombs of electrical charge.

As used herein the term "C Rate" refers to the charging or discharging rate of a cell or battery, expressed in terms of its total storage capacity in Ah or mAh. For example, a rate of 1C means utilization of all of the stored energy in one hour; a 0.1 C means utilization of 10% of the energy in one hour and the full energy in 10 hours; and a 5 C means full utilization of the energy in 12 minutes.

As used herein the term metal oxides include precursors of the metal oxides such as nitrates, carbonates, and acetates which can be converted to their corresponding metal oxides by heat treatment.

Substitution of fluoride ion for oxide ion in cation-substituted spinel oxide cathodes increases the reversible capacity due to a decrease in the oxidation state of Mn. Cation-substituted spinel oxyfluoride cathodes such as $LiMn_{1.8}Li_{0.1}Ni_{0.1}O_{3.79}F_{0.21}$ exhibit superior capacity retention at 60° C. with excellent rate capability compared to other spinel compositions like $LiMn_2O_4$, $LiMn_2O_{4-\eta}F_\eta$, $LiMn_{1.8}Li_{0.2}O_4$, and $LiMn_{1.8}Li_{0.2}O_{4-\eta}F_\eta$. The incorporation of fluoride ion in $LiMn_{2-y-z}Li_yM_zO_{4-\eta}F_\eta$ may range from an of greater than about 0.0 to about 0.5; however, the range may be between about 0.05 to about 0.27, between about 0.1 to about 0.25, between about 0.1 to about 0.21, or between about 0.1 to about 0.1. The value of y in $LiMn_{2-y-z}Li_yM_zO_{4-\eta}F_\eta$ may be between about 0.0 to about 0.3; however, the range may be between about 0.05 to about 0.27, between about 0.1 to about 0.25, between about 0.1 to about 0.2, or between about 0.1 to about 0.15. Similarly, z in $LiMn_{2-y-z}Li_yM_zO_{4-\eta}F_\eta$ may be between about 0.0 to about 1; however, the range may be between about 0.1 to about 0.9, between about 0.2 to about 0.8, between about 0.3 to about 0.7, between about 0.4 to about 0.6, between about 0.5 to about 0.6, or between about 0.01 to about 5.

Lithium ion batteries currently use the layered $LiCoO_2$ cathodes, but the high cost and toxicity of Co have prompted the development of alternative cathodes particularly for electric vehicle and hybrid electric vehicle applications. In this regard, both spinel $LiMn_2O_4$ and olivine $LiFePO_4$ have become appealing as Mn and Fe are inexpensive and environmentally benign. However, the $LiMn_2O_4$ spinel cathode has been plagued by severe capacity fade at elevated temperatures. Several mechanisms such as Jahn-Teller distortion,[1] manganese dissolution into the electrolyte,[2-5] formation of two cubic phases during the charge-discharge process,[6,7] and development of microstrain due to the difference in lattice parameter $\Delta a$ between the two cubic phases formed during cycling[8-11] have been proposed to account for the capacity fade.

The present inventors recognized that the cyclability at elevated temperatures, rate capability, and storage characteristics could be improved significantly by reducing the lattice parameter difference $\Delta a$ between the two cubic phases formed during cycling by appropriate cationic substitutions.[9-11] For example, doubly substituted spinel compositions such as $LiMn_{1.85}Li_{0.075}Ni_{0.075}O_4$ exhibit superior electrochemical performance compared to that of the unsubstituted $LiMn_2O_4$.

However, the substitution of lower valent cations such as $Li^+$ and $Ni^{2+}$ for $Mn^{3+/4+}$ in $LiMn_{2-2y}Li_yNi_yO_4$ increases the average oxidation state of Mn and decreases the reversible capacity to <about 100 mAh/g. The present inventors used the partial substitution of fluoride ions for oxide ions in the cation-substituted spinel oxides to obtain the corresponding spinel oxyfluoride cathodes. In this regard, Amatucci et al.[12-14] have investigated the substitution of $F^-$ for $O^{2-}$ in $Li_{1+x}Mn_{2-x}O_{4-\eta}F_\eta$ and $LiMn_{2-y}Al_yO_{4-\eta}F_\eta$ by synthesizing them using LiF at 800° C. and found that the fluorine substituted cathodes exhibit higher discharge capacity and better cyclability than $LiMn_2O_4$. More recently, Kang et al[15] have also found an improvement in cyclability with $Li_{1.05}Mn_{1.85}Al_{0.1}O_{4-\eta}F_\eta$ synthesized at 850° C. with LiF; however, the amount of fluorine incorporated into the lattice is strongly influenced by the firing temperature and time due to the volatilization of fluorine at elevated temperatures. In order to maximize the fluorine content in the spinel lattice, the present inventors developed a low temperature procedure involving the firing of the already synthesized cation-substituted spinel oxides $LiMn_{2-y-z}Li_yM_zO_4$ with a fluorine source (preferably ammonium hydrogen fluoride $NH_4HF_2$) at 450° C. for a short period of 5 hours. A comparison of the cyclability and rate capability of the oxyfluoride cathodes $LiMn_{2-y-z}Li_yM_zO_{4-\eta}F_\eta$ (M=Mg, Al, Ti, V, Cr, Fe, Co, Ni, Cu, Zn, Zr, Nb, Mo, Ga, Sn or a combination thereof and $0 \leq \eta \leq 0.2$) with those of the corresponding oxide cathodes and a correlation of the electrochemical performance to the lattice parameter difference $\Delta a$ between the two cubic phases formed during cycling and the degree of manganese dissolution are presented.

In some embodiments the firing of the already synthesized cation-substituted spinel oxides $LiMn_{2-y-z}Li_yM_zO_4$ with fluoride source at a temperature of between 200 and 649° C., between 300-600° C., between 350-550° C., between 400-500° C., or between 425-475° C. Similarly, the time that the already synthesized cation-substituted spinel oxides $LiMn_{2-y-z}Li_yM_zO_4$ and fluoride source are fired may be varied between 2-8 hours, between 2-6 hours, between 2-5 hours, between 2-4 hours, between 3-5 hours, or between 4-5 hours.

The cation-substituted $LiMn_{2-y-z}Li_yM_zO_4$ (M=Mg, Al, Ti, V, Cr, Fe, Co, Ni, Cu, Zn, Zr, Nb, Mo, Ga, Sn or a combination thereof) spinel oxides were synthesized by firing required amounts of $Li_2CO_3$ and $Mn_2O_3$ with $TiO_2$, NiO, or CuO at 800° C. for 48 hours in air. The fluorine-substituted $LiMn_{2-y-z}Li_yM_zO_{4-\eta}F_\eta$ oxyfluorides were prepared by firing the $LiMn_{2-y-z}Li_yM_zO_4$ oxide with a required amount of ammonium hydrogen difluoride ($NH_4HF_2$) at 450° C. for 5 hours in air. The skilled artisan will recognize that other similar compounds with similar characteristics may be substituted for ammonium hydrogen difluoride, e.g., ammonium fluoride $NH_4F$. Chemical extraction of lithium was carried out by stirring the $LiMn_{2-y-z}Li_yM_zO_{4-\eta}F_\eta$ powder with an acetonitrile solution of the oxidizer $NO_2BF_4$ for two days under argon atmosphere, followed by washing the products with acetonitrile.[16] The lithium contents in the products were determined by atomic absorption spectroscopy (AAS) and the average oxidation state of manganese was determined by a redox titration involving sodium oxalate and potassium permanganate. Lattice parameters of the initial samples as well as the two cubic phases formed during chemical delithiation were determined by the Rietveld analysis of the X-ray diffraction (XRD) data.[17] The degree of manganese dissolution was assessed by soaking the parent sample powders in the electrolyte containing 1 M $LiPF_6$ in 1:1 ethylene carbonate (EC) and diethyl carbonate (DEC) at 55° C. for seven days and determining the amount of manganese in the electrolyte with AAS.

Electrochemical performances were evaluated with CR2032 coin cells fabricated with metallic lithium anode, 1 M $LiPF_6$ in 1:1 ethylene carbonate (EC) and diethyl carbonate (DEC) electrolyte, Celgard polypropylene separator, and the cathodes. The cathodes were prepared by mixing the $LiMn_{2-y-z}Li_yM_zO_{4-\eta}F_\eta$ powders with about 20 weight percent conductive carbon and 5 weight percent polytetrafluoroethylene (PTFE) binder, rolling the mixture into thin sheets, and cutting into circular electrodes of 0.64 $cm^2$ area. The skilled artisan will recognize that the electrodes may be of shapes other than circular (e.g., polygonal, rectangular, oval, square, etc.) and that the electrode area may be any range.

Electrochemical data was collected between about 3.5 and 4.3 volts at both room temperature and about 60° C. at various rates ranging from C/10 to 4 C. The chemical, structural, and electrochemical characterization data of spinel manganese oxyfluorides and the average oxidation state values of the transition metal ions determined by the redox titration are given in TABLE 2 below.

TABLE 2

| Sample # | Composition | Mn valence[a] | Lattice parameter (Å) | Initial capacity (mAh/g) | Capacity loss in 50 cycles (%) | | Mn dissolution[b] (%) |
|---|---|---|---|---|---|---|---|
| | | | | | 25° C. | 60° C. | |
| 1 | $LiMn_2O_4$ | 3.50 | 8.2451 | 119 | 35.2 | 53.5 | 3.2 |
| 2 | $LiMn_2O_{3.92}F_{0.08}$ | 3.46 | 8.2497 | 119 | 29.4 | 43.3 | 2.6 |
| 3 | $LiMn_{1.8}Li_{0.2}O_4$ | 3.78 | 8.2002 | 78 | 2.5 | 4.4 | 1.5 |
| 4 | $LiMn_{1.8}Li_{0.2}O_{3.88}F_{0.12}$ | 3.71 | 8.2034 | 86 | 1.2 | 3.0 | 1.0 |
| 5 | $LiMn_{1.8}Li_{0.2}O_{3.79}F_{0.21}$ | 3.66 | 8.2113 | 100 | 2.3 | 3.4 | 1.1 |
| 6 | $LiMn_{1.8}Li_{0.1}Ti_{0.1}O_4$ | 3.61 | 8.2142 | 103 | 19.2 | 28.5 | 2.5 |

TABLE 2-continued

| Sample # | Composition | Mn valence[a] | Lattice parameter (Å) | Initial capacity (mAh/g) | Capacity loss in 50 cycles (%) 25° C. | Capacity loss in 50 cycles (%) 60° C. | Mn dissolution[b] (%) |
|---|---|---|---|---|---|---|---|
| 7 | $LiMn_{1.8}Li_{0.1}Ti_{0.1}O_{3.9}F_{0.1}$ | 3.56 | 8.2191 | 109 | 11.3 | 20.4 | 1.9 |
| 8 | $LiMn_{1.8}Li_{0.1}Cu_{0.1}O_4$ | 3.72 | 8.2069 | 86 | 9.5 | 18.8 | 2.0 |
| 9 | $LiMn_{1.8}Li_{0.1}Cu_{0.1}O_{3.9}F_{0.1}$ | 3.67 | 8.2087 | 93 | 6.4 | 11.1 | 1.7 |
| 10 | $LiMn_{1.8}Li_{0.1}Ni_{0.1}O_4$ | 3.72 | 8.2091 | 82 | 1.1 | 2.6 | 1.1 |
| 11 | $LiMn_{1.8}Li_{0.1}Ni_{0.1}O_{3.9}F_{0.1}$ | 3.67 | 8.2138 | 90 | 0.9 | 2.1 | 0.6 |
| 12 | $LiMn_{1.8}Li_{0.1}Ni_{0.1}O_{3.8}F_{0.2}$ | 3.61 | 8.2252 | 104 | 0.9 | 1.9 | 0.8 |

[a]Calculated by assuming $Li^+$, $Ti^{4+}$, $Ni^{2+}$, $Cu^{2+}$, and $F^-$.
[b]% dissolution based on sample weight.

With a given cationic composition, the oxidation state decreases with fluorine substitution due to the replacement of the divalent $O^{2-}$ ions by the monovalent $F^-$ ions. The fluorine contents in the synthesized samples were calculated based on the lithium content and the average oxidation state values of the transition metal ions obtained from, respectively, the AAS and redox titration data, employing charge neutrality principle and assuming the total anion (O+F) content to be 4.0. Based on the analytical data, a significant amount of fluorine ($0 \leq \eta \leq 0.21$) has been incorporated into the spinel lattice. The firing of the already synthesized oxide powders with $NH_4HF_2$ at a low temperature of about 450° C. helps to minimize the volatilization problems and maximize the fluorine content in the samples compared to the conventional high temperature (about 800° C.) synthesis of $LiMn_2O_{4-\eta}F_\eta$ with LiF as a fluorine source;[12-14] $NH_4HF_2$ decomposes above about 220° C. and acts as a facile fluorine source.

FIG. 1 is an image of the X-ray diffraction patterns of selected parent $LiMn_{2-y-z}Li_yM_zO_{4-\eta}F_\eta$ and chemically delithiated $Li_{1-x}Mn_{2-y-z}Li_yM_zO_{4-\eta}F_\eta$ spinel cathodes. An enlargement of the patterns over a small 2θ region of about 27 to 33° and about 63 to 67° to illustrate, respectively, the presence of $Mn_5O_8$ impurity phase and the formation of two cubic phases for the delithiated compositions is shown on the right. The reflections marked with * refer to $Mn_5O_8$ impurity.

FIG. 1 compares the XRD patterns of some spinel oxide and oxyfluoride compositions. The cation-substituted oxyfluorides such as $LiMn_{1.8}Li_{0.2}O_{3.79}F_{0.21}$ and $LiMn_{1.8}Li_{0.1}O_{3.8}F_{0.2}$ exhibit patterns similar to that of the parent cation-substituted oxides without any impurity phases. Attempts to incorporate more than about 0.2 fluorine into the cation-substituted spinel oxides resulted in the formation of $Mn_5O_8$ as an impurity phase. In contrast, a trace amount of $Mn_5O_8$ impurity phase was found even at a low fluorine content of about 0.08 (e.g., $LiMn_2O_{3.92}F_{0.08}$) in the absence of cation substitutions and the intensity of the reflections corresponding to $Mn_5O_8$ impurity increased with increasing fluorine content in $LiMn_2O_{4-\eta}F_\eta$. This could be due to the difficulty of lowering the oxidation state of Mn significantly below about 3.5+ in the case of $LiMn_2O_{4-\eta}F_\eta$ (without any cation substitution for Mn). TABLE 1 gives the lattice parameter values of the $LiMn_{2-y-z}Li_yM_zO_{4-\eta}F_\eta$ samples. With a given cationic composition, the lattice parameter increases with increasing fluorine content due to a reduction of the smaller $Mn^{4+}$ ions into larger $Mn^{3+}$ ions, confirming the replacement of $O^{2-}$ by $F^-$ in the bulk of the spinel lattice. This observation of the increase in lattice parameters is in agreement with that found before with the $Li_{1+x}Mn_{2-x-y}Al_yO_{4-\eta}F_\eta$ system.[14,15]

Figure 2:
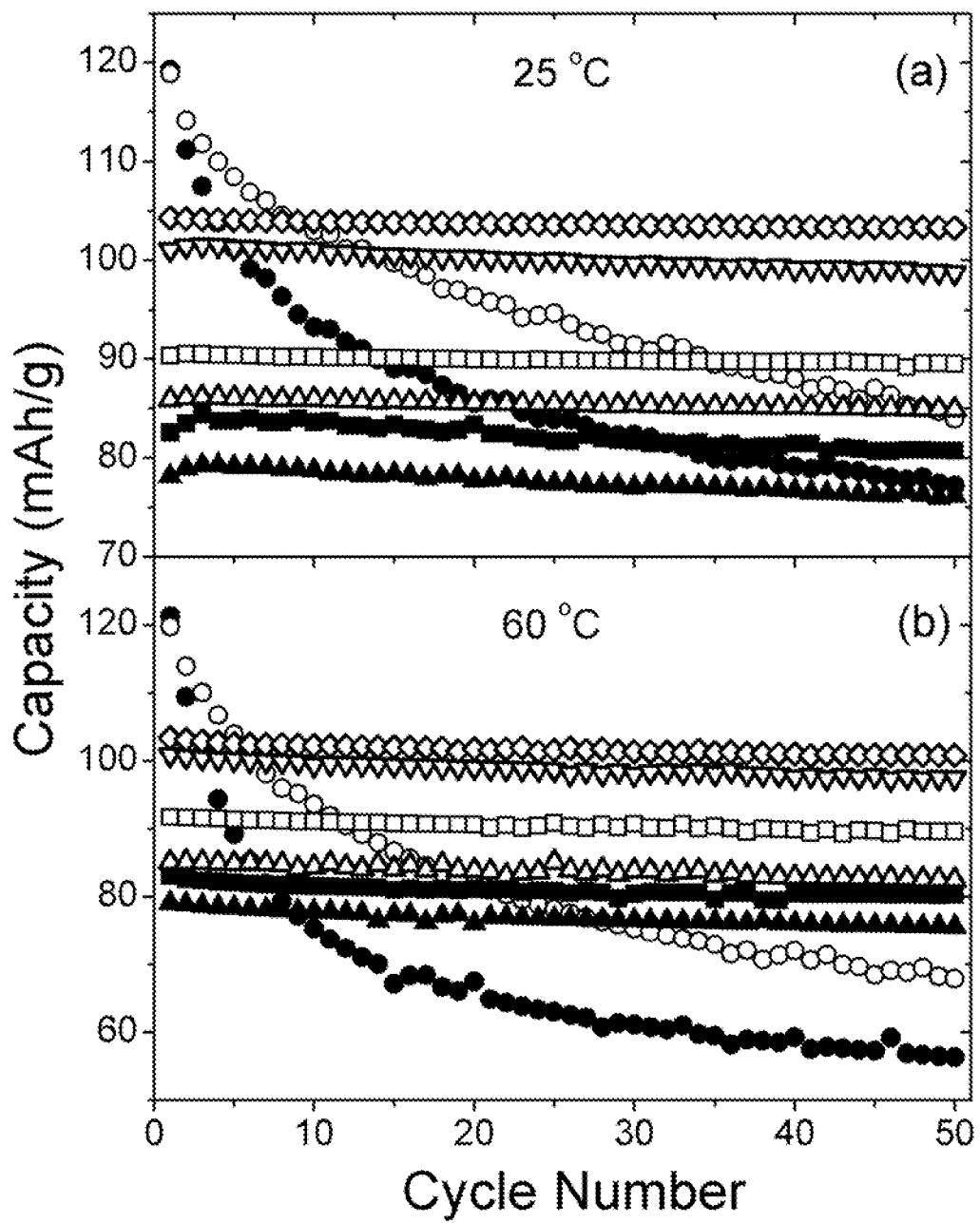
FIGS. 2A and 2B are graphs comparing the electrochemical cycling performances at different temperatures.

FIG. 2 compares the cycling performances of the $LiMn_2O_{4-\eta}F_\eta$ and $LiMn_{1.8}Li_{0.1}Ni_{0.1}O_{4-\eta}F_\eta$ cathodes at room temperature and about 60° C. at C/5 rate. FIG. 2A compares the electrochemical cycling performances of the cathodes at about 25° C. FIG. 2B compares the electrochemical cycling performances of the cathodes at about 60° C. of $LiMn_{2-y-z}Li_yM_zO_{4-\eta}F_\eta$; (●) $LiMn_2O_4$, (○) $LiMn_2O_{3.92}F_{0.08}$, (▲) $LiMn_{1.8}Li_{0.2}O_4$, (Δ) $LiMn_{1.8}Li_{0.2}O_{3.88}F_{0.12}$, (▽) $LiMn_{1.8}Li_{0.2}O_{3.79}F_{0.21}$, (■) $LiMn_{1.8}Li_{0.1}Ni_{0.1}O_4$, (□) $LiMn_{1.8}Li_{0.1}Ni_{0.1}O_{3.9}F_{0.1}$, and (◊) $LiMn_{1.8}Li_{0.1}Ni_{0.1}O_{3.8}F_{0.2}$. The initial capacity values and the percent capacity loss after 50 cycles at about 25° C. and about 60° C. are summarized in TABLE 1 above. The oxyfluoride spinel compositions exhibit up to about 20 mAh/g higher capacities than the corresponding oxide counterparts due to a lowering of the oxidation state of manganese. For example, $LiMn_{1.8}Li_{0.1}Ni_{0.1}O_4$, $LiMn_{1.8}Li_{0.1}Ni_{0.1}O_{3.9}F_{0.1}$, and $LiMn_{1.8}Li_{0.1}Ni_{0.1}O_{3.8}F_{0.2}$ exhibit initial capacities of 82, 90, and 104 mAh/g with capacity fades of only 1.1, 0.9, and 0.9%, respectively, in about 50 cycles at room temperature. $LiMn_{1.8}Li_{0.1}Ni_{0.1}O_4$, $LiMn_{1.8}Li_{0.1}Ni_{0.1}O_{3.9}F_{0.1}$, and $LiMn_{1.8}Li_{0.1}Ni_{0.1}O_{3.8}F_{0.2}$ show capacity fades of, respectively, 2.6, 2.1, and 1.9% in 50 cycles at about 60° C. compared to around 50% fade for $LiMn_2O_4$. $LiMn_2O_{3.92}F_{0.08}$ also exhibits an improvement in the capacity retention compared to $LiMn_2O_4$ as has been found before,[12-14] but without any increase in the initial capacity, possibly due to the presence of the electrochemically inactive impurity phase $Mn_5O_8$.[13,18] Although fluorine substitution is known before in the literature to improve the cyclability as in the cases of $Li_{1+x}Mn_{2-x}O_{4-\eta}F_\eta$,[12-14] $LiMn_{2-y}Al_yO_{4-\eta}F_\eta$,[12-14] and $Li_{1.05}Mn_{1.85}Al_{0.1}O_{4-\eta}F_\eta$,[15] the substitution of fluorine in certain optimized cation-substituted compositions such as $LiMn_{1.8}Li_{0.1}Ni_{0.1}O_{3.8}F_{0.2}$ offers much superior capacity retention at elevated temperatures without sacrificing the capacity values significantly (>100 mAh/g). Furthermore, the improved capacity retention with fluorine substitution in the spinels is also consistent with similar observations made recently with layered oxides by Kang et al[19,20] and Kim et al.[21]

Figure 3:
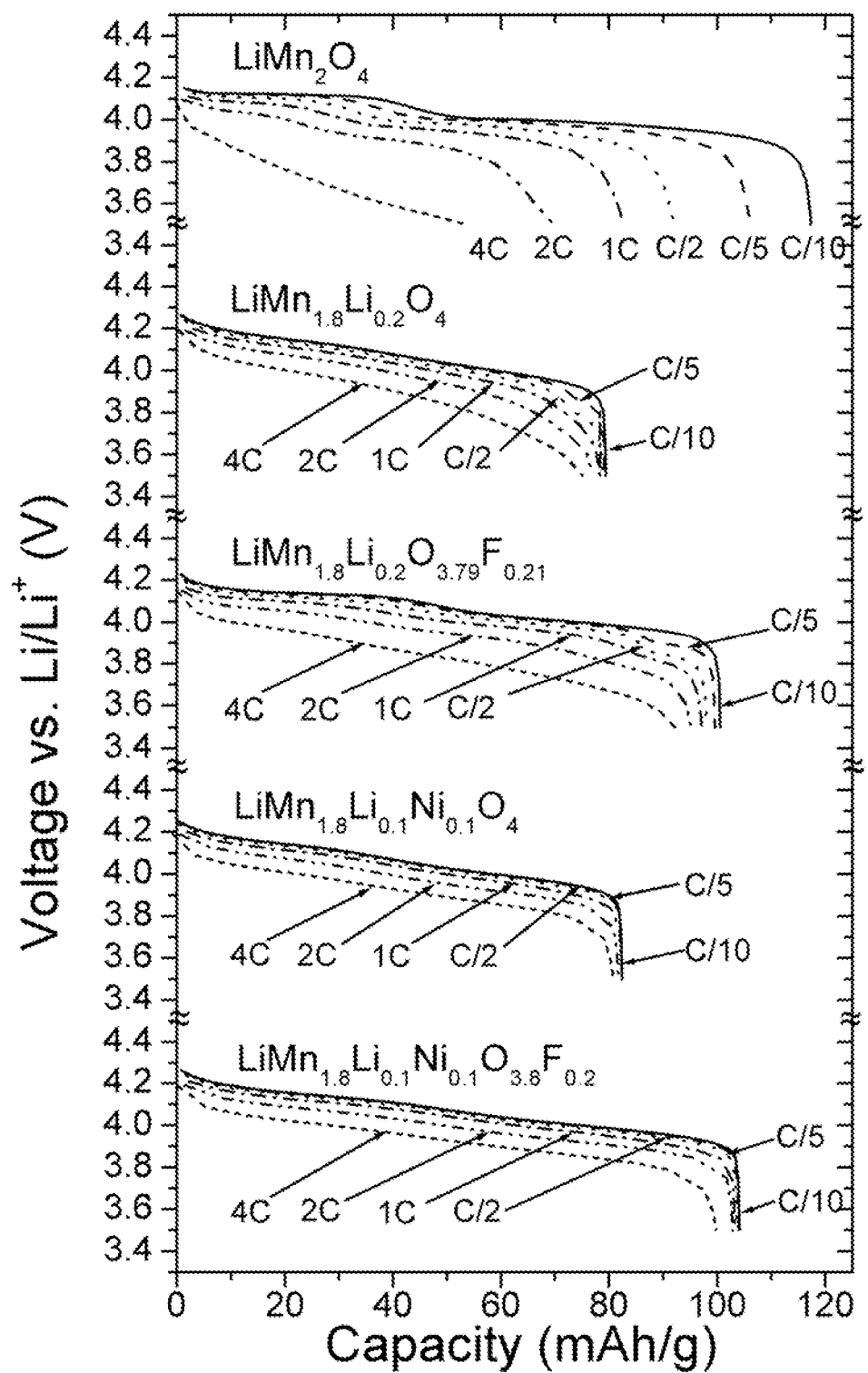
FIG. 3 is a graph comparing the discharge profiles at various C rates.

FIG. 3 is a graph comparing the discharge profiles at various C rates, illustrating the rate capabilities of $LiMn_2O_4$, $LiMn_{1.8}Li_{0.2}O_{4-\eta}F_\eta$, and $LiMn_{1.8}Li_{0.1}Ni_{0.1}O_{4-\eta}F_\eta$ at different rates (C/10 to 4 C) after charging up to about 4.3 V at C/10 rate. The cation-substituted oxide samples $LiMn_{1.8}Li_{0.2}O_4$ and $LiMn_{1.8}Li_{0.1}Ni_{0.1}O_4$ retain, respectively, 95% and 98% of their capacity on going from C/10 to 4 C rate, but with low capacity values of about 75 and about 81 mAh/g at a 4 C rate. In contrast, the cation-substituted oxyfluoride samples $LiMn_{1.8}Li_{0.2}O_{3.79}F_{0.21}$ and $LiMn_{1.8}Li_{0.1}Ni_{0.1}O_{3.8}F_{0.2}$ retain, respectively, 92% and 96% of their C/10 capacity at 4 C rate, but still with reasonable capacities of about 92 and about 100 mAh/g at 4 C rate. Thus the cation-substituted oxyfluorides exhibit a combination of excellent cyclability with acceptable capacity values without sacrificing the rate capability significantly.

The evolution of the cubic to cubic phase transition and the two-phase region that occur around $(1-x) \approx 0.3$ to 0.5 during the charge-discharge process of the spinel cathodes was monitored. Oxide spinel cathodes studied have revealed a correlation of the electrochemical performance to the lattice parameter difference $\Delta a$ between the two cubic phases formed.[9,10] FIG. 1 compares the XRD patterns of the $Li_{1-x}Mn_2O_{4-\eta}F_\eta$, $Li_{1-x}Mn_{1.8}Li_{0.2}O_{4-\eta}F_\eta$, and $Li_{1-x}Mn_{1.8}Li_{0.1}Ni_{0.1}O_{4-\eta}F_\eta$ $(0.35 \leq (1-x) \leq 0.4)$ samples obtained by chemical delithiation with an acetonitrile solution of $NO_2BF_4$. While $Li_{0.37}Mn_2O_4$ shows two distinct peaks around $2\theta \approx 65°$ corresponding to the two cubic phases with a larger lattice parameter difference $\Delta a$, the fluorine-substituted $Li_{1-x}Mn_2O_{3.92}F_{0.08}$ (without cation substitution) shows a reduced separation between the two peaks. On the other hand, both $Li_{0.37}Mn_{1.8}Li_{0.2}O_{3.79}F_{0.21}$ and $Li_{0.34}Mn_{1.8}Li_{0.1}Ni_{0.1}O_{3.8}F_{0.2}$ (with cation substitutions) show only a broad peak due to a much smaller lattice parameter difference $\Delta a$ between the two cubic phases. The broad reflections could nevertheless be resolved by Rietveld analysis to obtain the lattice parameters for the two cubic phases.

Figure 4:
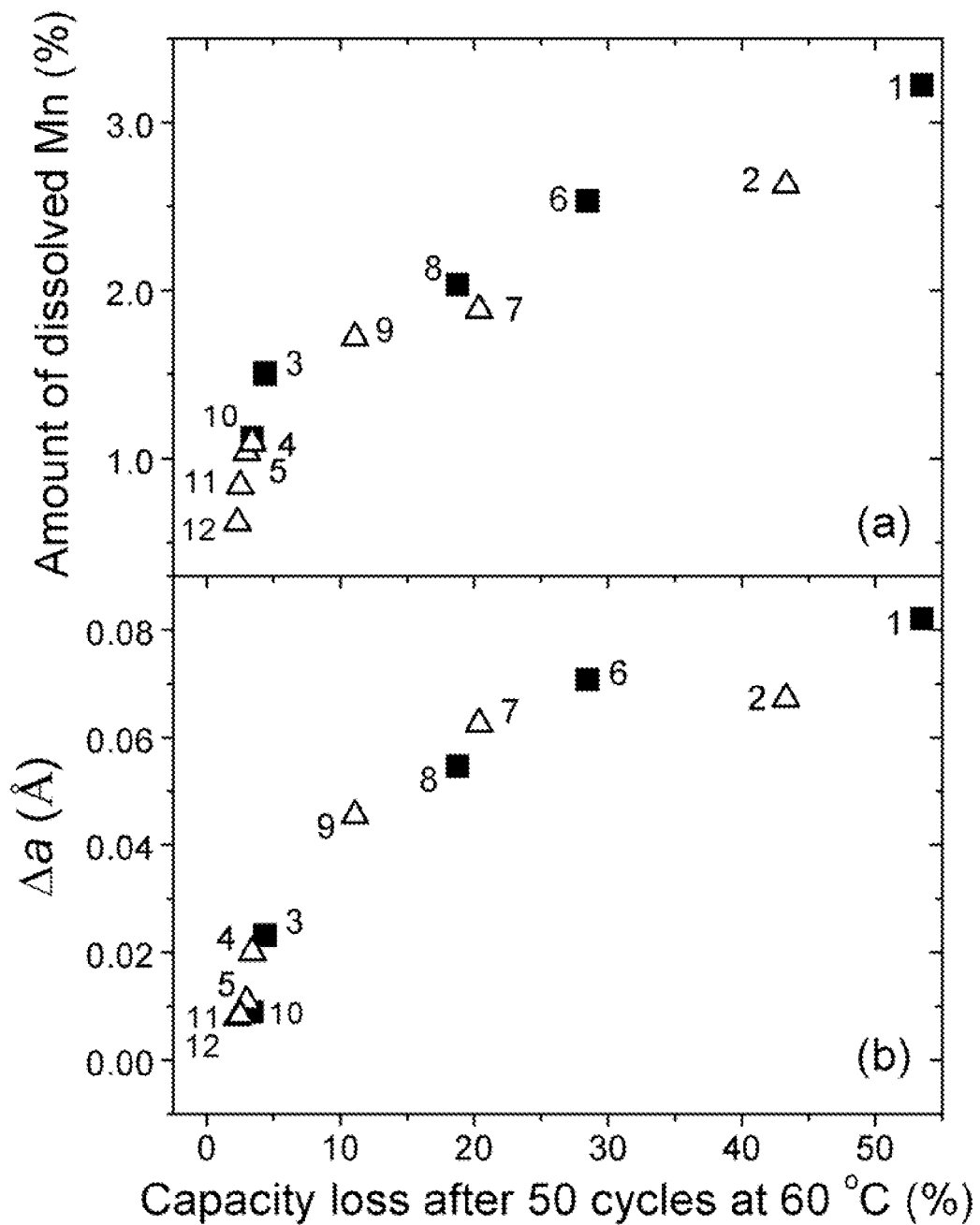
FIGS. 4A and 4B are graphs that illustrate the correlation of the capacity fade to 4A the degree of manganese dissolution and 4B the lattice parameter difference $\Delta a$ between the two cubic phases formed during the charge-discharge process.

FIG. 4A shows graphs that correlate the capacity fade in about 50 cycles at about 60° C. to the degree of manganese dissolution and FIG. 4B shows graphs that correlate the capacity fade in about 50 cycles at 60° C. to the lattice parameter difference $\Delta a$ between the two cubic phases formed during the charge-discharge process. Closed squares and open triangles refer, respectively, to the oxide and oxyfluoride cathodes. The numbers refer to the sample numbers in TABLE 2. FIG. 4B correlates the capacity fade to the lattice parameter difference $\Delta a$. Both the cationic and fluorine substitutions lower $\Delta a$, and the capacity fade decreases with decreasing $\Delta a$. The $\Delta a$ values vary slightly with the lithium content, and the $\Delta a$ values used in FIG. 4 are the maximum values in the two-phase region with $(1-x) \approx 0.35-0.40$. FIG. 4A also compares the degree of manganese dissolution and correlates the capacity fade to manganese dissolution. The capacity fade decreases with decreasing degree of manganese dissolution, confirming the manganese dissolution as a cause of capacity fade as has been widely believed in the literature. The degree of manganese dissolution decreases significantly with some cationic substitutions such as the co-substitution of Li and Ni for Mn compared to Li and Ti for Mn. More importantly, with a given cationic substitution, the anionic substitution with fluorine causes a further reduction in the degree of manganese dissolution. The surface passivation by fluoride ions as well as the more ionic Mn—F bond compared to the Mn—O bond may lead to a suppression of manganese dissolution. Manganese dissolution bears a relationship to the lattice parameter difference $\Delta a$, and the capacity fade decreases with both decreasing $\Delta a$ and manganese dissolution as seen in FIG. 4. Thus, the reduced interfacial lattice strain due to the smaller $\Delta a$ in the two-phase region as well as the suppressed manganese dissolution leads to improved capacity retention.

Figure 5:
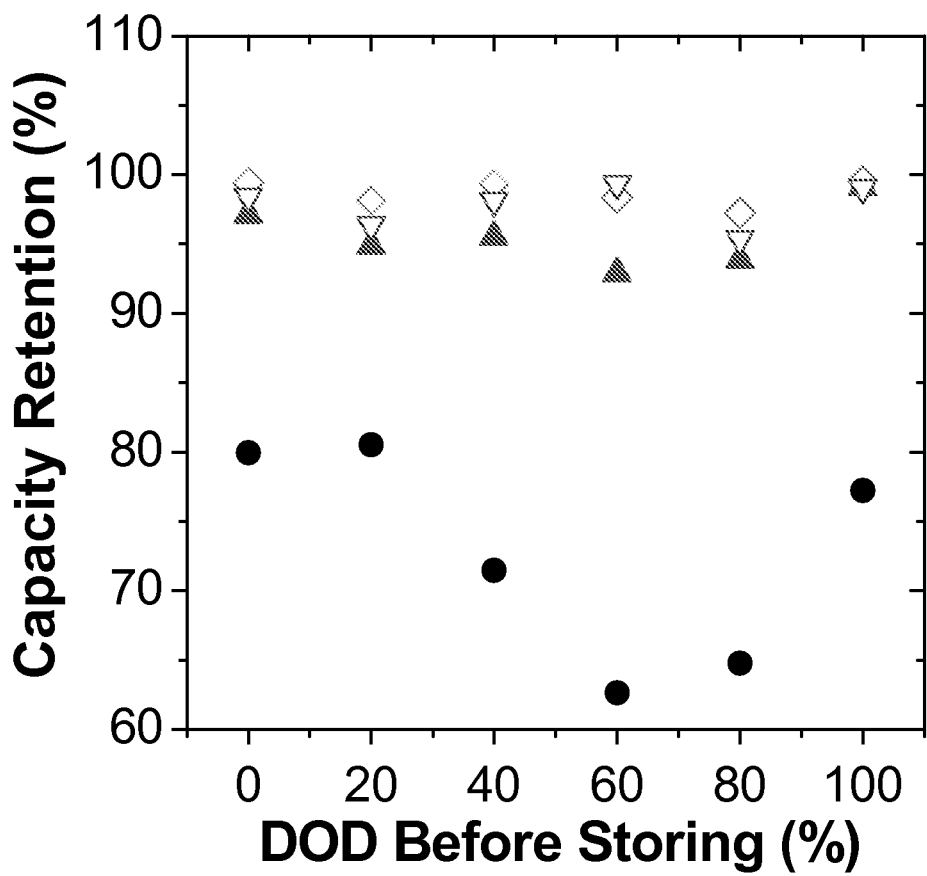
FIG. 5 is a graph that compares the percent capacity retention after storing at various depths of discharge for $LiMn_2O_4$, $LiMn_{1.8}Li_{0.2}O_4$, $LiMn_{1.8}Li_{0.2}O_{3.79}F_{0.21}$, and $LiMn_{1.8}Li_{0.1}Ni_{0.1}O_{3.8}F_{0.2}$.

The superior electrochemical performance of $LiMn_{1.8}Li_{0.1}Ni_{0.1}O_{3.79}F_{0.21}$ with a capacity of 104 mAh/g is found to be due to a significantly suppressed manganese dissolution caused by a much smaller lattice parameter difference between the two cubic phases formed during the charge-discharge process. The study demonstrates that appropriate cationic and anionic substitutions in the manganese-based spinel cathodes may offer a viable strategy to develop them for EV and HEV applications. FIG. 5 is a graph that compares the percentage capacity retention after storing at 60° C. for 7 days at different depth of discharge (DOD): (●) $LiMn_2O_4$, (▲) $LiMn_{1.8}Li_{0.2}O_4$, (▽) $LiMn_{1.8}Li_{0.2}O_{3.79}F_{0.21}$, and (◇) $LiMn_{1.8}Li_{0.1}Ni_{0.1}O_{3.8}F_{0.2}$. The storage performances were evaluated by subjecting the coin cells to one charge-discharge cycle at room temperature between 4.3 and 3.5 V, followed by discharging to various depths of discharge (DOD) in the second cycle. The sample was then stored at 60° C. for 7 days at various DOD. The second discharge cycle was completed after cooling to ambient temperature. The full discharge capacity in the third cycle was evaluated at room temperature. The percent capacity retention was obtained as a ratio of the third discharge capacity to the first discharge capacity. Although $LiMn_2O_4$ loses a significant amount of capacity after storage (20-40%), the cation-substituted oxyfluorides retain >95% of their initial capacity, illustrating excellent storage characteristics. Thus, the oxyfluoride cathodes offer a combination of excellent cyclability and storage characteristics.

The major issue with the spinel cathodes is the severe capacity fade at elevated temperatures, which is largely believed to be due to the dissolution of manganese from the lattice into the electrolyte and then its migration into and interaction with the carbon anode. The manganese dissolution is due to a disproportionation of the $Mn^{3+}$ ions into $Mn^{4+}$ and $Mn^{2+}$ ions in the presence of trace amounts of protons (acidic HF) generated by $LiPF_6$ and trace amounts of water present in the electrolyte. Cationic and anionic (fluorine) substitutions help to reduce significantly the manganese dissolution and the lattice parameter difference $\Delta a$ between the two cubic phases formed during the charge-discharge process, which lead to good electrochemical performance. Alternatively, the protons generated may be captured within another material in the beginning stages of the charge-discharge process to lower the manganese dissolution.

Chemical delithiation studies with an oxidizer $NO_2BF_4$ in acetonitrile medium have shown that layered oxide cathode compositions such as $Li_{1-x}CoO_2$ and $Li_{1-x}Mn_{0.5}Ni_{0.5}O_2$, and $Li_{1-x}Mn_{1/3}Ni_{1/3}CO_{1/3}O_2$ incorporate protons into the lattice due to an ion exchange of $Li^+$ with $H^+$ at deep lithium extraction.[22] One way to suppress manganese dissolution from the spinel cathodes is to employ a mixed cathode consisting of predominantly the spinel and small amounts of a layered oxide, charge the mixture initially to high enough voltages (e.g., about 4.7 V) to overcharge (deep lithium extraction) the layered oxide and trap the protons into the over-charged layered oxide lattice. The mixture can then be cycled under the normal operating voltage region of about 3.5 to about 4.3 volts. The present invention includes a mixture of an optimized cation- and anion-substituted spinel cathode and a layered oxide cathode such as $LiCoO_2$ and $LiMn_{0.5}Ni_{0.5}O_2$.

Figure 6:
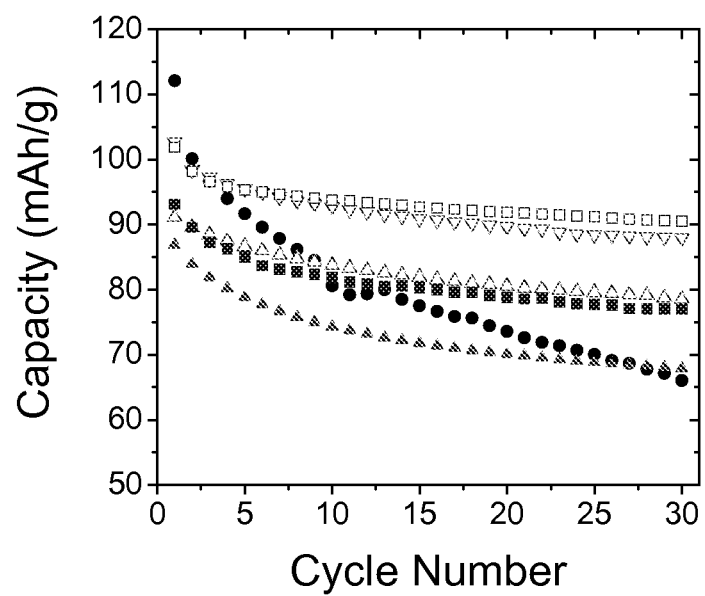
FIG. 6 is a graph that compares the cycling performance of lithium ion cells having various ratios of spinel and layered oxide mixture cathodes and commercial carbon anode.

FIG. 6 is a graph of the cycling performance of lithium ion cells having spinel $LiMn_2O_4$, a mixture of spinel $LiMn_{1.85}Li_{0.075}Ni_{0.04}Al_{0.035}O_4$ and layered $LiCoO_2$, and a mixture of spinel $LiMn_{1.8}Li_{0.1}Ni_{0.1}O_{3.8}F_{0.2}$ and layered $LiCoO_2$ cathodes and commercial carbon anode at 60° C. at C/5 rate. The studies were carried out by first charging up to 4.7 volts in the first cycle and then cycling between 4.3 and 3.5 volts at 60° C.: (●) $LiMn_2O_4$, (▲) $LiMn_{1.85}Li_{0.075}Ni_{0.04}Al_{0.035}O_4$ (△) 80 wt % $LiMn_{1.85}Li_{0.075}Ni_{0.04}Al_{0.035}O_4$ and 20 wt % $LiCoO_2$, (▽) 70 wt % $LiMn_{1.85}Li_{0.075}Ni_{0.04}Al_{0.035}O_4$ and 30 wt % $LiCoO_2$, (■) $LiMn_{1.8}Li_{0.1}Ni_{0.1}O_{3.8}F_{0.2}$, and (□) 70 wt % $LiMn_{1.8}Li_{0.1}Ni_{0.1}O_{3.8}F_{0.2}$ and 30 wt % $LiCoO_2$. Each lithium ion cell was charged up to 4.7 volts in the first cycle and allowed to rest in open-circuit (no load applied) for 2 hours. The lithium ion cells were then cycled between 3.5 and 4.3 volts. While $LiMn_2O_4$ shows severe capacity fade of 33% after 30 cycles with a continuous decline in capacity, the cation-substituted $LiMn_{1.85}Li_{0.075}Ni_{0.04}Al_{0.035}O_4$ exhibits a better cycling performance, with the capacity value becoming more stable after 7 cycles.

The mixtures of spinel and layered oxide cathode not only provide much better cyclability but also a significant increase in capacity. For example, $LiMn_{1.85}Li_{0.075}Ni_{0.04}Al_{0.035}O_4$, a mixture of 80 wt % $LiMn_{1.85}Li_{0.075}Ni_{0.04}Al_{0.035}O_4$ and 20 wt % $LiCoO_2$, and a mixture of 70 wt % $LiMn_{1.85}Li_{0.075}Ni_{0.04}Al_{0.035}O_4$ and 30 wt % $LiCoO_2$ exhibit initial capacities of 87, 91, and 103 mAh/g with capacity fades of only 21.9, 13.8, and 14.4%, respectively, in 30 cycles. Furthermore, an initial capacity of 102 mAh/g was achieved with a capacity fade of 11.2% with a cathode mixture of 70 wt % $LiMn_{1.8}Li_{0.1}Ni_{0.1}O_{3.8}F_{0.2}$ and 30 wt % $LiCoO_2$.

Figure 7:
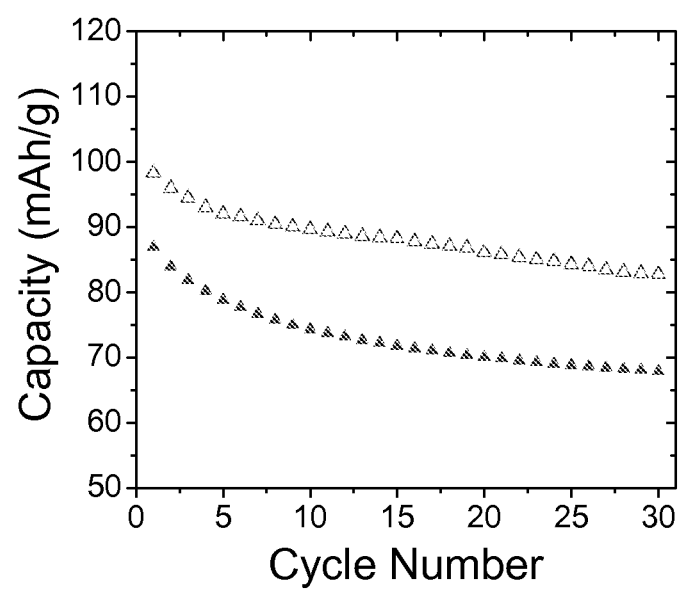
FIG. 7 is a graph of the cycling performance of lithium ion cells having various ratios of spinel and layered oxide mixture cathodes and commercial carbon anode.

Similar improvements in cyclability are also seen with lithium ion cells fabricated with a mixture of spinel and layered $LiNi_{0.5}Mn_{0.5}O_2$ oxide cathode. FIG. 7 is a graph of the cycling performance of lithium ion cells having various ratios of spinel and layered oxide mixture cathodes and commercial carbon anode. The studies were carried out by first charging up to 4.7 volts in the first cycle and then cycling between 4.3 and 3.5 volts at 60° C.: (▲) $LiMn_{1.85}Li_{0.075}Ni_{0.04}Al_{0.035}O_4$ and (Δ) 80 wt % $LiMn_{1.85}Li_{0.075}Ni_{0.04}Al_{0.035}O_4$ and 20 wt % $LiNi_{0.5}Mn_{0.5}O_2$. As seen in FIG. 7, a mixture of 80 wt % $LiMn_{1.85}Li_{0.075}Ni_{0.04}Al_{0.035}O_4$ and 20 wt % $LiNi_{0.5}Mn_{0.5}O_2$ shows better cyclability than the corresponding spinel cathode alone. Further work with this strategy is in progress.

The manganese dissolution with lithium ion cells (coin cells) fabricated with the mixture of spinel and layered cathodes has also been studied. The mixture in deed shows lower manganese dissolution compared to the corresponding spinel alone cathodes, demonstrating that the layered oxide cathodes could help to capture the protons on initially subjecting the cells to over-charge to >4.3 volts.

In addition, the surface of the carbon anode may be modified or coated with an oxide anode like spinel $Li_4Ti_5O_{12}$ or $TiO_2$. Such a surface modification will help to avoid the interaction of the dissolved manganese with the carbon anode and the consequent degradation in electrochemical performance. Advantageously, both spinel $Li_4Ti_5O_{12}$ or $TiO_2$ will contribute to the anode capacity. These materials could be generated on the graphite surface by solution-based techniques, followed by firing at moderate temperatures between 300 and 900° C. in an inert atmosphere. Such surface modification of carbon anodes could also be adopted with other oxides that may or may not contribute to capacity, e.g., oxides of Mg, Al, Si, V, Cr, Fe, Co, Ni, Cu, Zn, Ga, Ge, Y, Zr, Nb, Mo, Cd, In, Sn, Sb, La, Ce, Hf, Ta, W, and Bi. The surface modification could also be pursued with conductive polymers, e.g., polyaniline and polypyrrole. The amount of the surface modifying material could be 1 wt % to 10 wt %. The modification of the carbon surface with other species may eliminate the direct interaction of any dissolved manganese from the cation-substituted spinel oxide or oxyfluoride cathodes and thereby provide long term stability and good cyclability to the lithium ion cells.

In addition, dopants may be incorporated into the present invention. Dopants as used herein are elements or compounds selected to demonstrate the concept. The dopants are used to replace the transition metal M and are not used to take the place of lithium ions in the lithium metal oxide. For example, dopants for use in the present invention include metals and nonmetals such as Mg, Al, Ti, V, Cr, Fe, Co, Ni, Cu, Zn, Zr, Nb, Mo, Ga, Sn, Si, and B and combinations thereof.

Although the present invention contemplates many fluorine sources known to the skilled artisan (e.g., $NH_4HF_2$), other fluorine sources may be used as well. For example, the spinel oxide powder may be dispersed in a dilute hydrofluoric acid solution, evaporated, and fired at lower temperatures (200-500° C.) to obtain the oxyfluoride compositions. Ammonium hydrogen fluoride or ammonium fluoride may be dissolved in a solvent (e.g., methanol or ethanol) and the spinel oxide powder may be disperse therein, evaporated, and fired at lower temperatures (e.g., 200-500° C.) to obtain the oxyfluoride compositions. Ammonium hydrogen fluoride may be dissolved in a solvent (e.g., methanol or ethanol) and the spinel oxide powder dispersed therein, refluxed, filtered, and fired at lower temperatures (e.g., 200-500° C.) to obtain the oxyfluoride compositions. Ammonium hydrogen fluoride may be dissolved in a solvent like ethanol, iso-propanol, or water, and the spinel oxide powder dispersed therein. The mixture may be kept in an autoclave under hydrothermal or solvothermal condition at 80-250° C., filtered, and fired at lower temperatures (e.g., 200-500° C.) to obtain the oxyfluoride compositions. Also, the oxide spinel powder may be mixed with ammonium hydrogen fluoride solid, ground, pelletized, and fired at between about 300 and 500° C.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. M. M. Thackeray, Y. Shoa-Horn, A. J. Kahaian, K. D. Kepler, E. Skinner, J. T. Vaughey, and S. A. Hackney, *Electrochem. Solid-State Lett.,* 1, 7 (1998).
2. D. H. Jang, Y. J. Shin, and S. M. Oh, J. Electrochem. Soc., 143, 2204 (1996).
3. T. Inoue and M. Sano, J. Electrochem. Soc., 145, 3704 (1998).
4. H. Yamane, T. Inoue, M. Fujita, and M. Sano, J. Power Sources, 99, 60 (2001).
5. H. Huang, C. A. Vincent, and P. G. Bruce, J. Electrochem. Soc., 146, 3649 (1999).
6. Y. Xia and M. Yoshio, J. Electrochem. Soc., 143, 825, (1996).
7. J. H. Lee, J. K. Hong, D. H. Jang, Y. K. Sun, and S. M. Oh, J. Power Sources, 89, 7 (2000).
8. Y. Shin and A. Manthiram, Electrochem. Solid-State Lett., 5, A55 (2002).
9. Y. Shin and A. Manthiram, Electrochem. Solid-State Lett., 6, A34 (2003).
10. Y. Shin and A. Manthiram, Chem. Mater., 15, 2954 (2003).
11. Y. Shin and A. Manthiram, J. Electrochem. Soc., 151, A204 (2004).
12. G. G. Amatucci, N. Pereira, T. Zheng, I. Plitz, and J. M. Tarascon, J. Power Sources, 81, 39 (1999).
13. G. G. Amatucci, N. Pereira, T. Zheng, and J. M. Tarascon, J. Electrochem. Soc., 148, A171 (2001).
14. G. Amatucci, A. D. Pasquier, A. Blyr, T. Zheng, and J. M. Tarascon, Electrochim. Acta, 45, 255 (1999).
15. Y.-J. Kang, J.-H. Kim, and Y.-K. Sun, J. Power Sources, 146, 237 (2005).
16. R. V. Chebiam, F. Prado, and A. Manthiram, Chem. Mater., 13, 2951 (2001).
17. R. A. Young, The Rietveld Method, Oxford University Press, New York (1993).
18. J. T. Son and H. G. Kim, J. Power Sources, 147, 220 (2005)
19. S.-H. Kang, I. Belharouak, Y. K. Sun, and K. Amine, J. Power Sources, 146, 650 (2005).
20. S.-H. Kang, and K. Amine, J. Power Sources, 146, 654 (2005).
21. G.-H. Kim, J.-H. Kim, S.-T. Myung, C. S. Yoon, and Y.-K. Sun, J. Electrochem. Soc., 152, A1707 (2005).
22. J. Choi, E. Alvarez, T. A. Arunkumar, and A. Manthiram, *Electrochem. Solid State Lett.,* 9, A241 (2006).

What is claimed is:

1. A cathode, comprising:
  a $LiMn_{2-y-z}Li_yM_zO_{4-\eta}F_\eta$ cation-substituted spinel oxide material, wherein y is from about 0 to about 0.3, z is from about 0 to about 1.0, M is a metal, and $\eta$ is greater than 0 and less than about 0.5; and
  one or more layered oxide materials comprising $Li[Ni,Mn,Co,Li]O_2$,
  wherein the one or more layered oxide materials are in contact with the cation-substituted spinel oxide material.

2. The cathode of claim 1, wherein M is selected from the group consisting of Mg, Al, V, Cr, Fe, Ti, Co, Ni, Cu, Zn, Zr, Nb, Mo, Ga, Sn and combinations thereof.

3. The cathode of claim 1, wherein the cathode comprises from about 20 wt % to about 95 wt % of the cation-substituted spinel oxide material and the cathode comprises from about 5 wt % to about 80 wt % of the one or more layered oxide materials.

4. The cathode of claim 1, wherein:
  the cathode comprises from about 70 wt % to about 80 wt % of the $LiMn_{2-y-z}Li_yM_zO_{4-\eta}F_\eta$ cation-substituted spinel oxide material,
  the $LiMn_{2-y-z}Li_yM_zO_{4-\eta}F_\eta$ cation-substituted spinel oxide material is selected from the group consisting of $LiMn_{1.8}Li_{0.1}Ni_{0.1}O_{3.8}F_{0.2}$, $LiMn_{1.8}Li_{0.2}O_{3.88}F_{0.12}$, $LiMn_{1.8}Li_{0.2}O_{3.79}F_{0.21}$, $LiMn_{1.8}Li_{0.1}Ti_{0.1}O_{3.9}F_{0.1}$, $LiMn_{1.8}Li_{0.1}Cu_{0.1}O_{3.9}F_{0.1}$, $LiMn_{1.8}Li_{0.1}Ni_{0.1}O_{3.9}F_{0.1}$, and combinations thereof,
  the cathode comprises from about 20 wt % to about 30 wt % of the one or more layered oxide materials, and
  the one or more layered oxide materials are selected from the group consisting of $LiCoO_2$, $LiNi_{0.5}Mn_{0.5}O_2$, and combinations thereof.

5. The cathode of claim 1, wherein the cation-substituted spinel oxide material is selected from the group consisting of $LiMn_{1.8}Li_{0.2}O_{3.88}F_{0.12}$, $LiMn_{1.8}Li_{0.2}O_{3.79}F_{0.21}$, $LiMn_{1.8}Li_{0.1}Ti_{0.1}O_{3.9}F_{0.1}$, $LiMn_{1.8}Li_{0.1}Cu_{0.1}O_{3.9}F_{0.1}$, $LiMn_{1.8}Li_{0.1}Ni_{0.1}O_{3.9}F_{0.1}$, $LiMn_{1.8}Li_{0.1}Ni_{0.1}O_{3.8}F_{0.2}$, and combinations thereof.

6. The cathode of claim 1, wherein the one more layered oxide materials are selected from the group consisting of $LiCoO_2$, $LiNi_{0.5}Mn_{0.5}O_2$ and combinations thereof.

7. The cathode of claim 1, wherein the cathode comprises from about 20 wt % to about 95 wt % of the cation-substituted spinel oxide material.

8. The cathode of claim 1, wherein the cathode comprises from about 70 wt % to about 80 wt % of the cation-substituted spinel oxide material.

9. The cathode of claim 1, wherein the cathode comprises from about 5 wt % to about 80 wt % of the one or more layered oxide materials.

10. The cathode of claim 1, wherein the cathode comprises from 20 wt % to about 30 wt % of the one or more layered oxide materials.

* * * * *